United States Patent [19]
Yamada et al.

[11] Patent Number: 6,089,766
[45] Date of Patent: Jul. 18, 2000

[54] AUTO-ALIGNMENT SYSTEM FOR A PRINTING DEVICE

[75] Inventors: Akitoshi Yamada; Hiromitsu Hirabayashi, both of Irvine, Calif.

[73] Assignee: Canon Kabushiki Kaisha, Tokyo, Japan

[21] Appl. No.: 08/901,560

[22] Filed: Jul. 28, 1997

[51] Int. Cl.⁷ ........................................... B41J 2/36
[52] U.S. Cl. .................. 400/120.09; 400/120.15
[58] Field of Search ...................... 347/5, 19; 400/74, 400/73, 120.09, 120.15

[56] References Cited

U.S. PATENT DOCUMENTS

| | | | |
|---|---|---|---|
| 3,858,703 | 1/1975 | Duley | 197/1 R |
| 4,272,771 | 6/1981 | Furukawa | 346/75 |
| 5,166,699 | 11/1992 | Yano et al. | 346/1.1 |
| 5,367,325 | 11/1994 | Yano et al. | 347/17 |
| 5,469,267 | 11/1995 | Wang | 358/298 |
| 5,477,246 | 12/1995 | Hirabayashi et al. | 347/12 |
| 5,508,826 | 4/1996 | Lloyd et al. | 358/501 |
| 5,519,419 | 5/1996 | Stephany, et al. | 347/19 |
| 5,530,460 | 6/1996 | Wehl | 347/19 |
| 5,552,810 | 9/1996 | Matsuo | 347/19 |
| 5,696,542 | 12/1997 | Matsubara et al. | 347/12 |
| 5,696,890 | 12/1997 | Geissler et al. | 395/109 |
| 5,838,342 | 11/1998 | Takahashi et al. | 347/19 |

FOREIGN PATENT DOCUMENTS

| | | |
|---|---|---|
| 613062 | 8/1994 | European Pat. Off. . |
| 724965 | 8/1996 | European Pat. Off. . |
| 50-81437 | 11/1974 | Japan . |

*Primary Examiner*—John S. Hilten
*Attorney, Agent, or Firm*—Fitzpatrick, Cella, Harper & Scinto

[57] ABSTRACT

A method for controlling an image printing device includes printing a plurality of test patterns, the density of each test pattern depending upon a measurement object, determining a relationship between image densities of a plurality of the printed test patterns, and acquiring information on the measurement object based on the determined relationship.

33 Claims, 39 Drawing Sheets

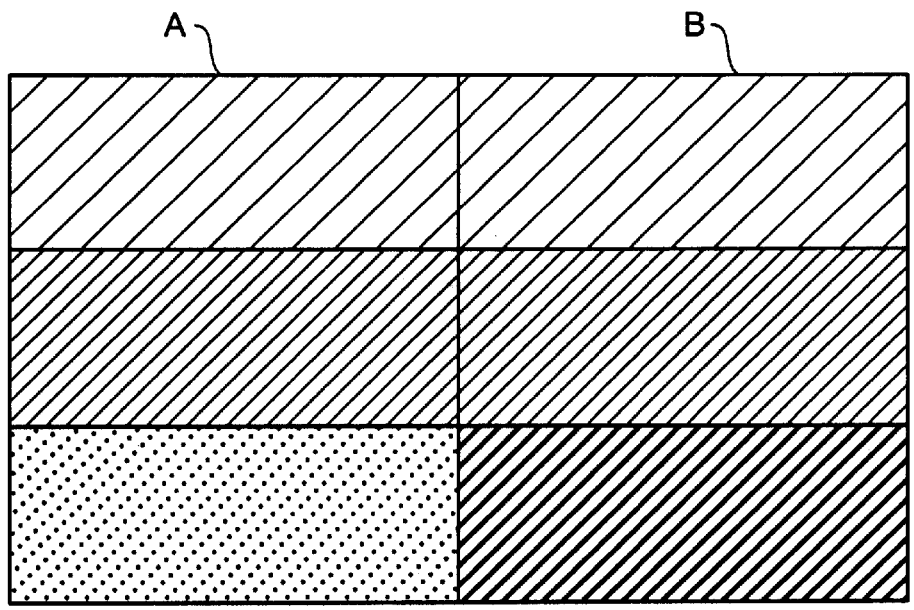
FIG. 1A
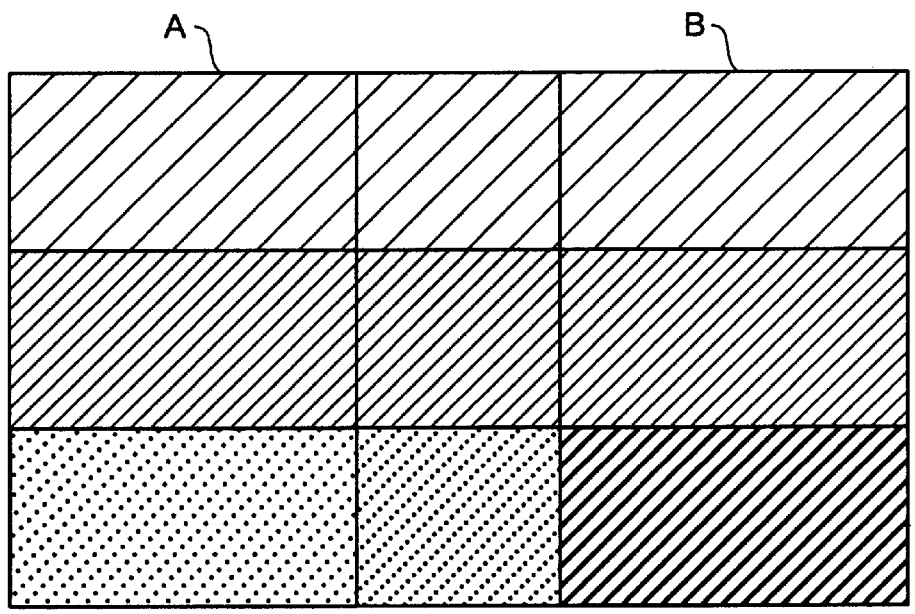
FIG. 1B
FIG. 1

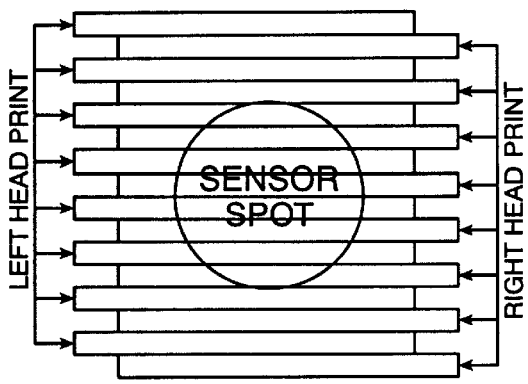
1 DOT-1 SPACE
0 SHIFT
FIG. 7A
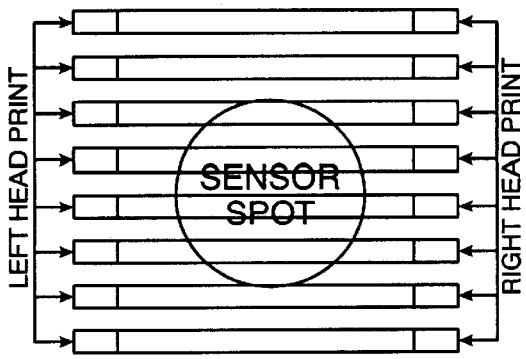
1 DOT-1 SPACE
1 SHIFT
FIG. 7B
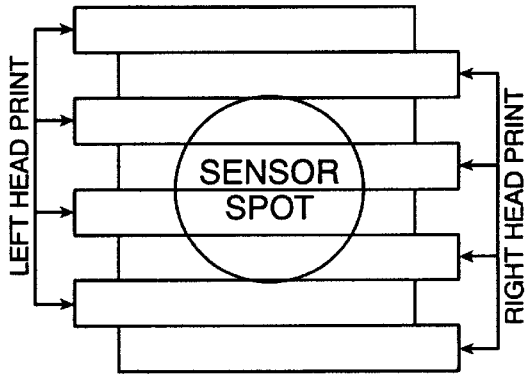
2 DOT-2 SPACE
0 SHIFT
FIG. 7C
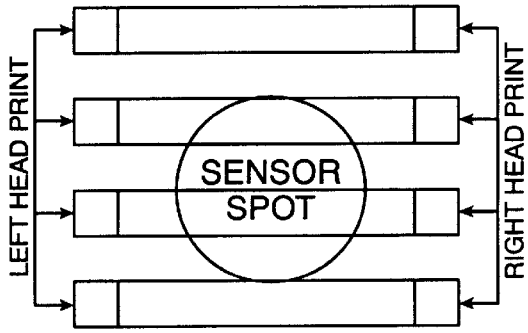
2 DOT-2 SPACE
2 SHIFT
FIG. 7D
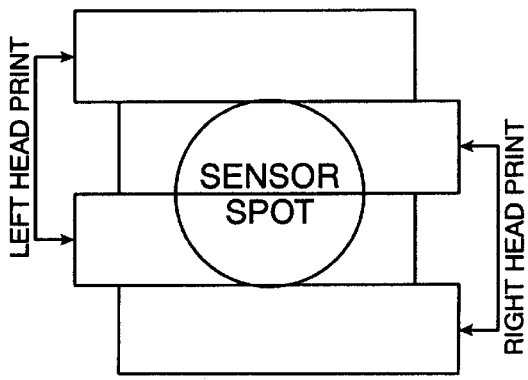
4 DOT-4 SPACE
0 SHIFT
FIG. 7E
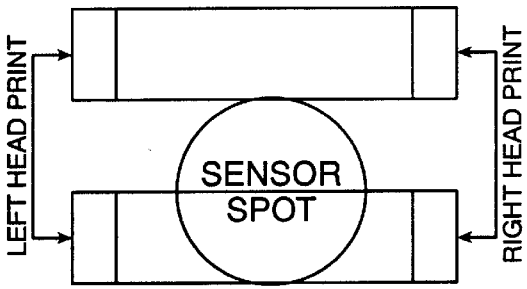
4 DOT-4 SPACE
4 SHIFT
FIG. 7F
FIG. 7

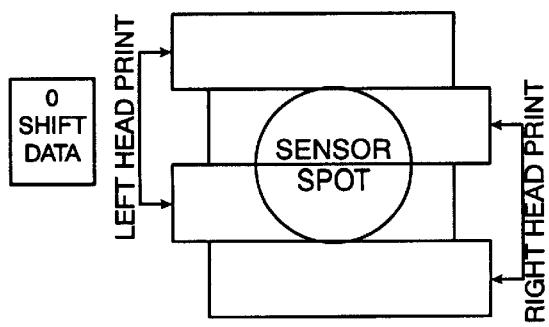
FIG. 12A
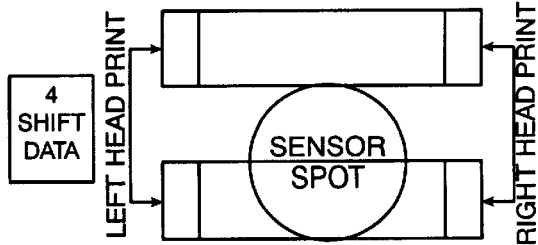
FIG. 12B
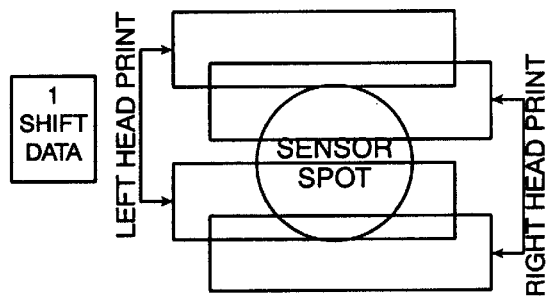
FIG. 12C
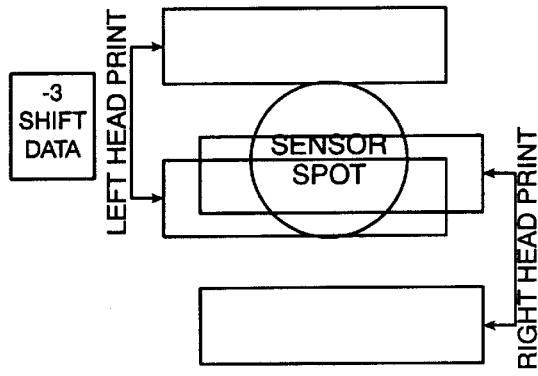
FIG. 12D
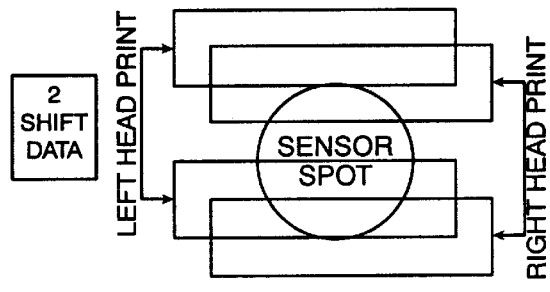
FIG. 12E
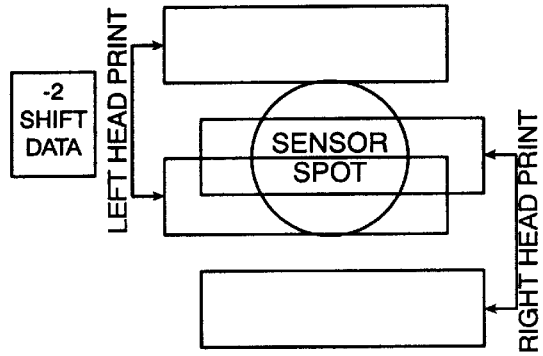
FIG. 12F
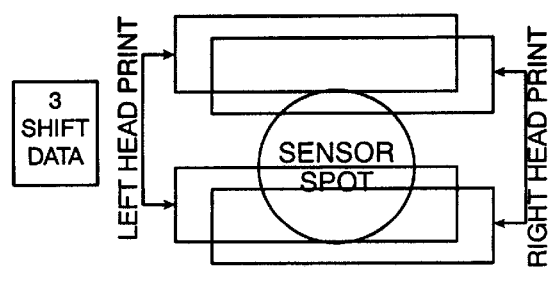
FIG. 12G
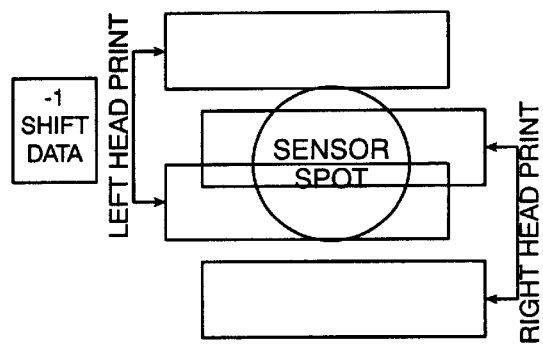
FIG. 12H
FIG. 12

| 1 DOT - 1 SPACE | Y | Y | N | N | Y | Y | N | N |
|---|---|---|---|---|---|---|---|---|
| 2 DOT - 2 SPACE | Y | Y | Y | Y | N | N | N | N |
| 4 DOT - 4 SPACE | Y | N | Y | N | Y | N | Y | N |
| HEAD SHIFT | 0 | 4 | 1 | -3 | 2 | -2 | 3 | -1 |

Y (NORMAL DATA > SHIFTED DATA)
N (NORMAL DATA < SHIFTED DATA)

FIG. 14

| HEAD SHIFT | 2 | | | RESULT |
|---|---|---|---|---|
| DATA | Y : NORMAL | | N : SHIFT | |
| 1 DOT - 1 SPACE | 4.14 | > | 4.12 | Y |
| 2 DOT - 2 SPACE | 4.11 | < | 4.14 | N |
| 4 DOT - 4 SPACE | 4.14 | > | 4.03 | Y |

UNIT: V

FIG. 15

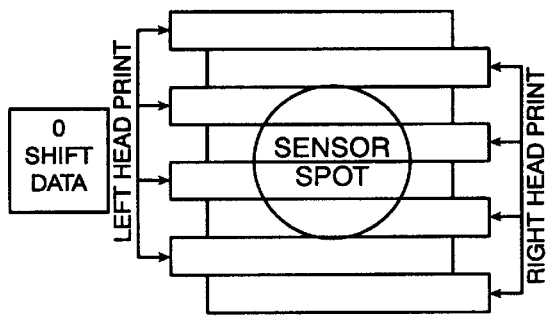
FIG. 16A
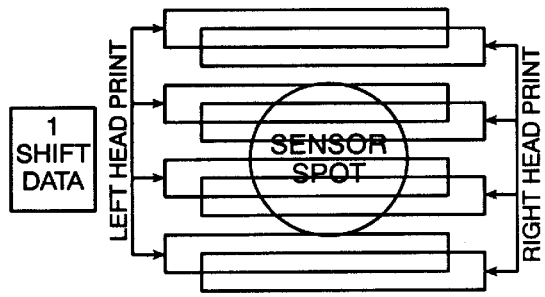
FIG. 16B
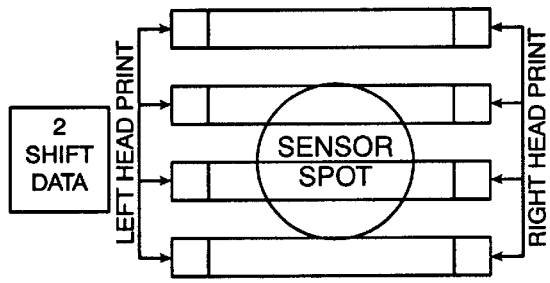
FIG. 16C
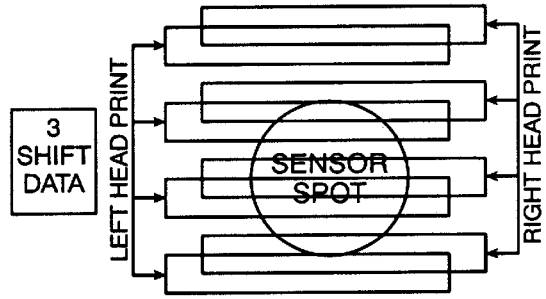
FIG. 16D
FIG. 16

| 2 DOT - 2 SPACE | 2 | 2 | 3 | 3 | 0 | 0 | 1 | 1 |
|---|---|---|---|---|---|---|---|---|
| 4 DOT - 4 SPACE | Y | N | Y | N | Y | N | Y | N |
| HEAD SHIFT | 0 | 4 | 1 | -3 | 2 | -2 | 3 | -1 |

2 (2 SHIFT DATA IS SMALLEST)
3 (3 SHIFT DATA IS SMALLEST)
0 (0 SHIFT DATA IS SMALLEST)
1 (1 SHIFT DATA IS SMALLEST)
Y (NORMAL DATA > SHIFTED DATA)
N (NORMAL DATA < SHIFTED DATA)

FIG. 19

| HEAD SHIFT | 0 | | | |
|---|---|---|---|---|
| DATA SHIFT | 0 | 1 | 2 | 3 |
| VERTICAL | 4.07 | 4.07 | 4.03 | 4.07 |
| HORIZONTAL | 4.10 | 4.07 | 4.05 | 4.07 |
| BI-DIRECTION | 4.16 | 4.15 | 4.13 | 4.15 |

UNIT: V

FIG. 20

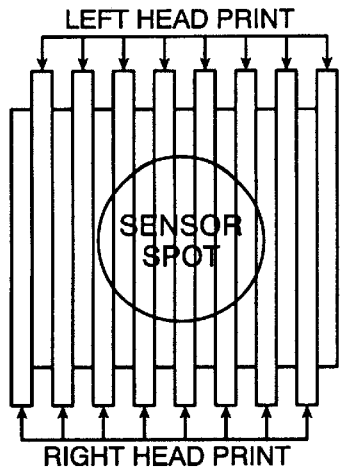
FIG. 22A  1 DOT-1 SPACE / 0 SHIFT
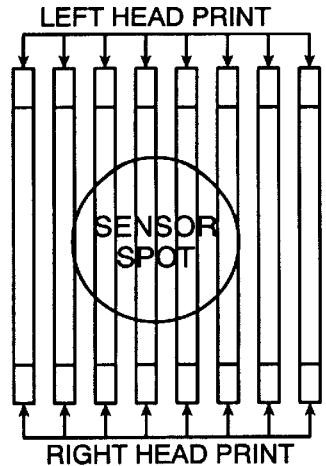
FIG. 22B  1 DOT-1 SPACE / 1 SHIFT
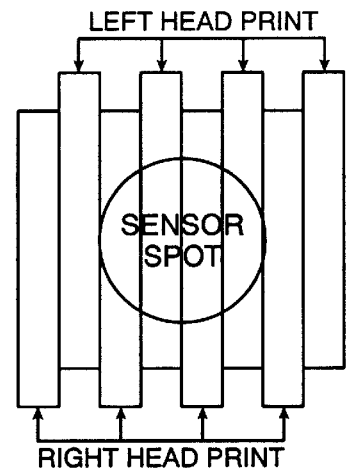
FIG. 22C  2 DOT-2 SPACE / 0 SHIFT
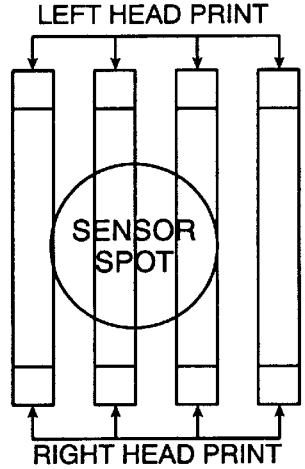
FIG. 22D  2 DOT-2 SPACE / 2 SHIFT
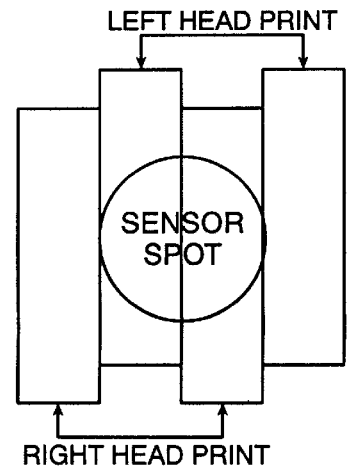
FIG. 22E  4 DOT-4 SPACE / 0 SHIFT
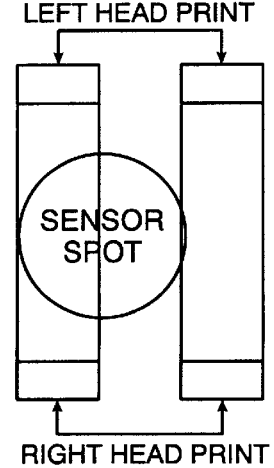
FIG. 22F  4 DOT-4 SPACE / 4 SHIFT
FIG. 22

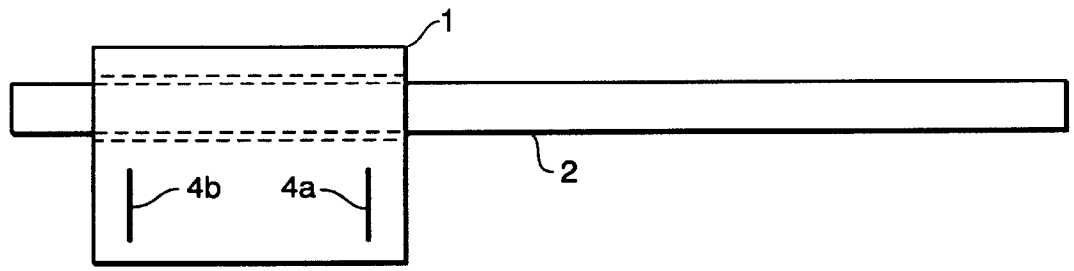
FIG. 23A
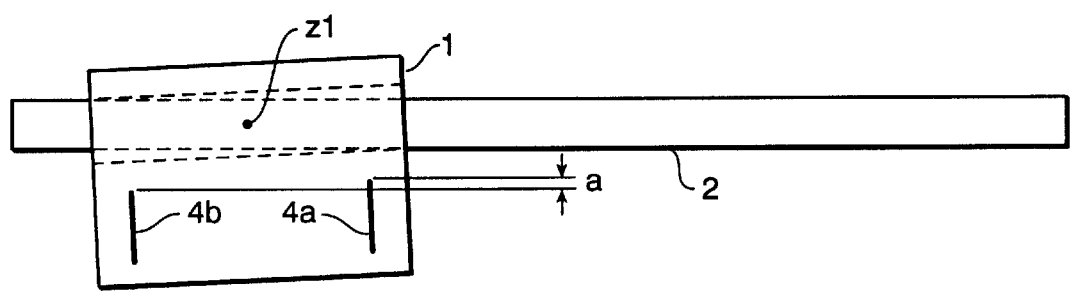
FIG. 23B
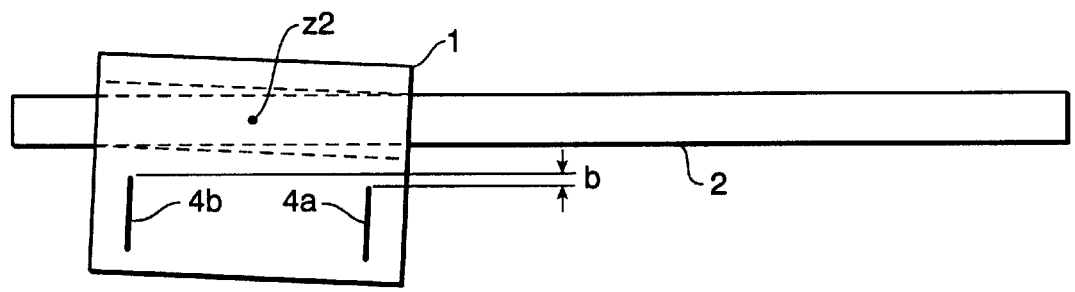
FIG. 23C
FIG. 23

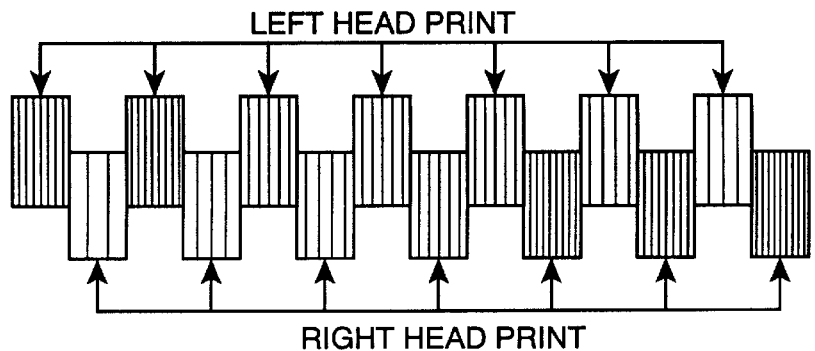
FIG. 24A
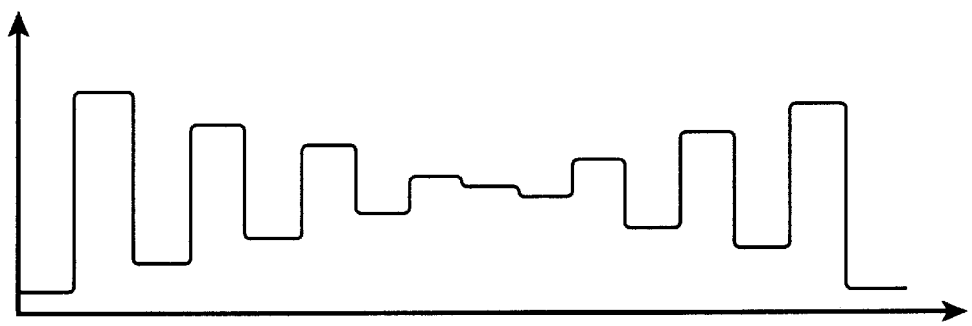
FIG. 24B
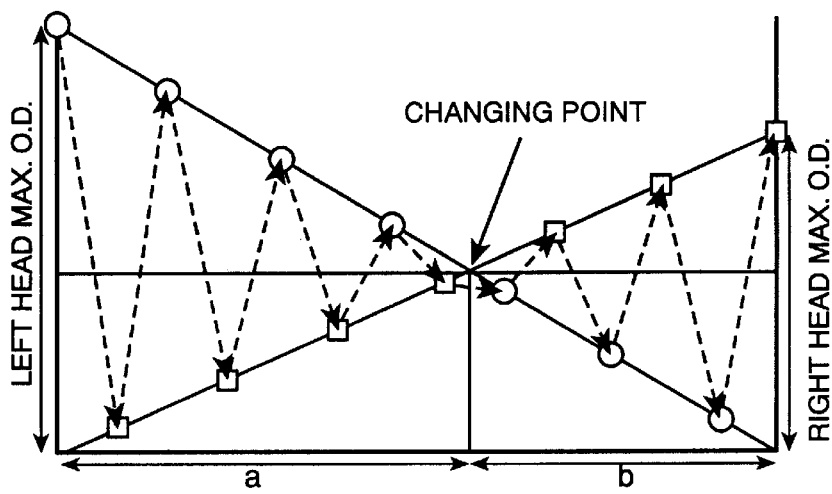
a : b = Left Max : Right Max
FIG. 24C
FIG. 24

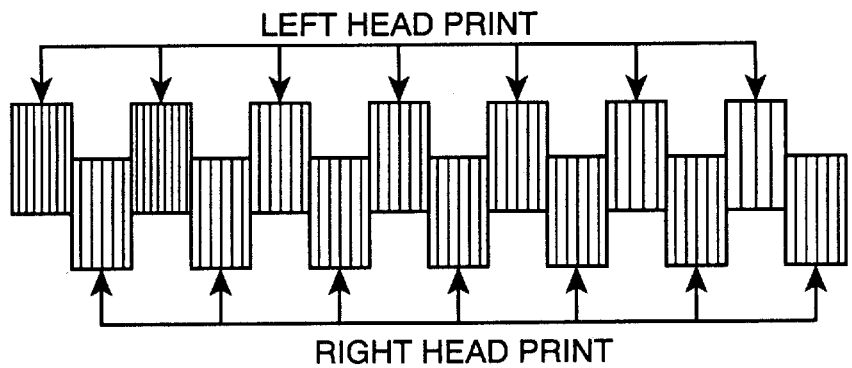
FIG. 26A
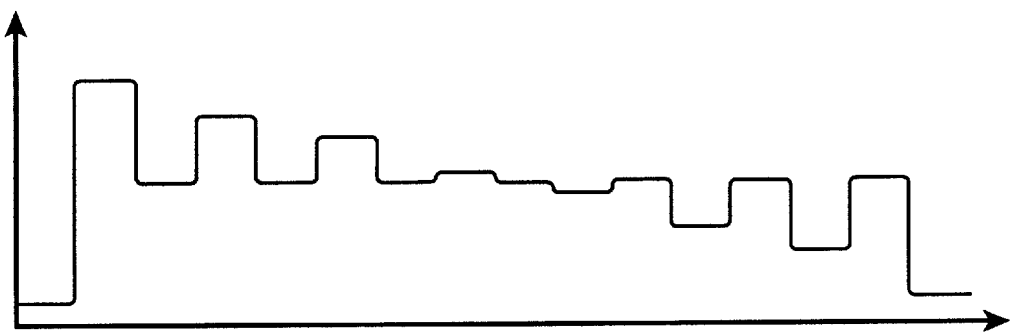
FIG. 26B
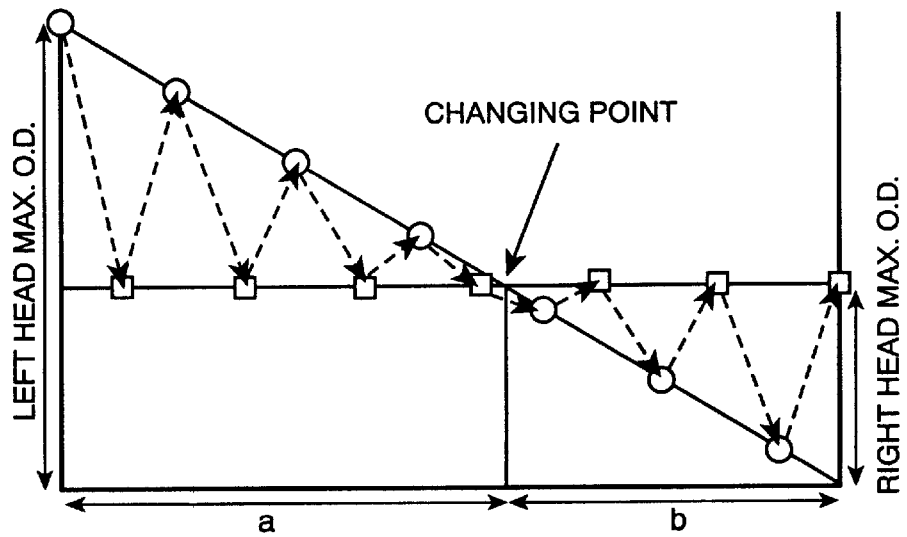
a + b : b = Left Max : Right Max
FIG. 26C
FIG. 26 a : b = Left Max : Right Max
c : d = Left Half : Right Half

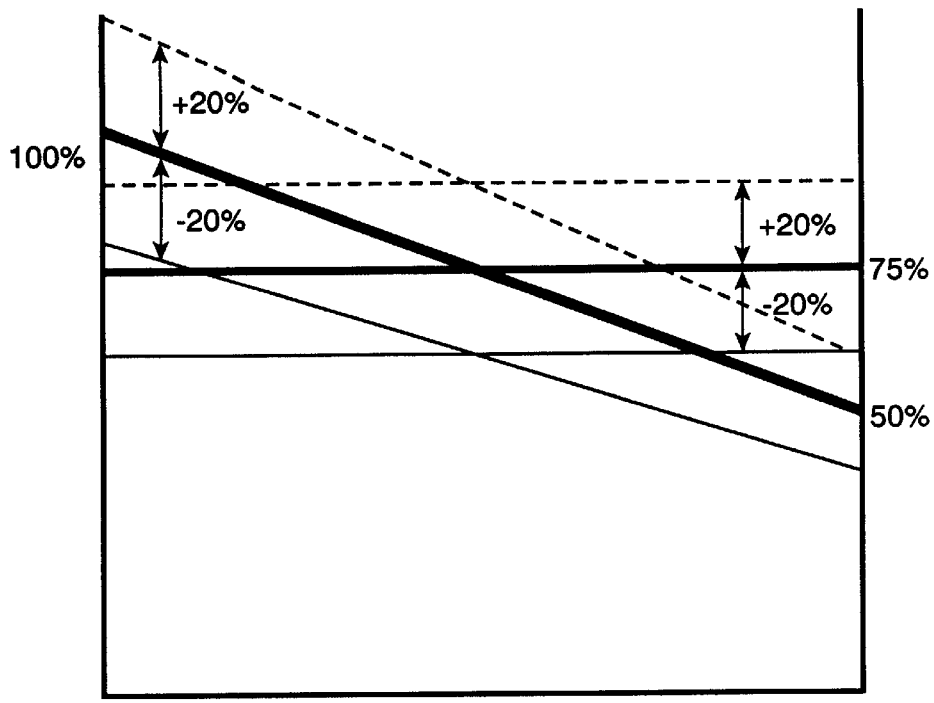
FIG. 28A
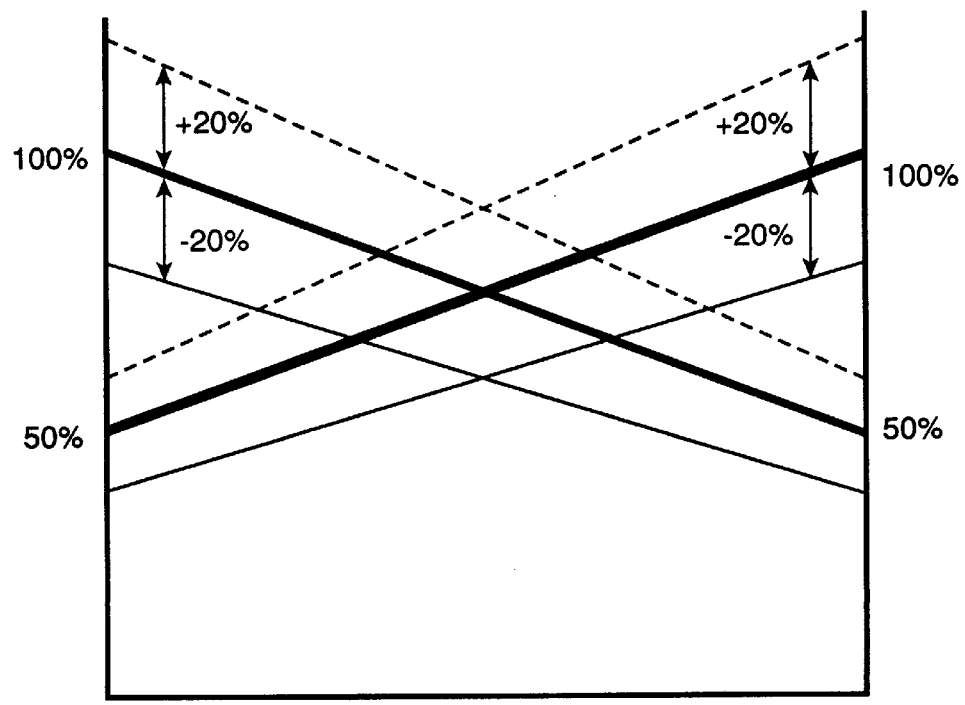
FIG. 28A
FIG. 28

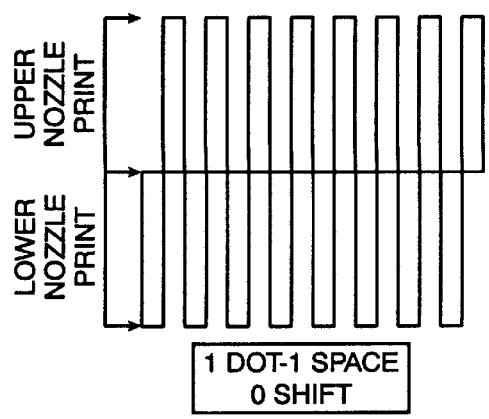
1 DOT-1 SPACE
0 SHIFT
FIG. 34A
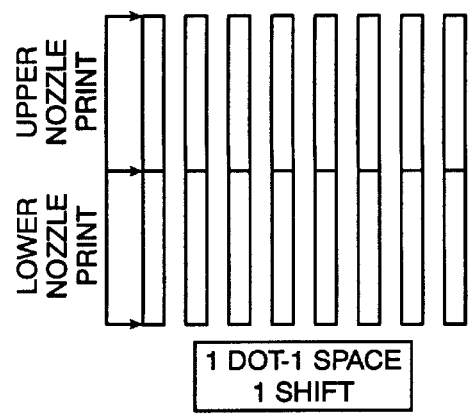
1 DOT-1 SPACE
1 SHIFT
FIG. 34B
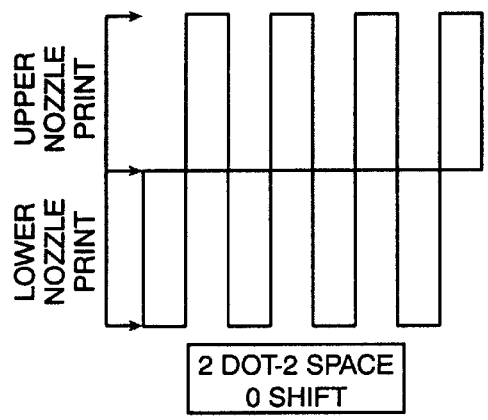
2 DOT-2 SPACE
0 SHIFT
FIG. 34C
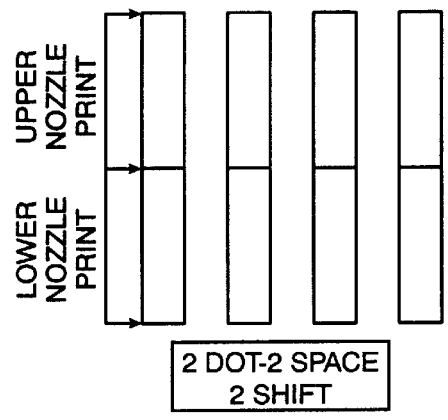
2 DOT-2 SPACE
2 SHIFT
FIG. 34D
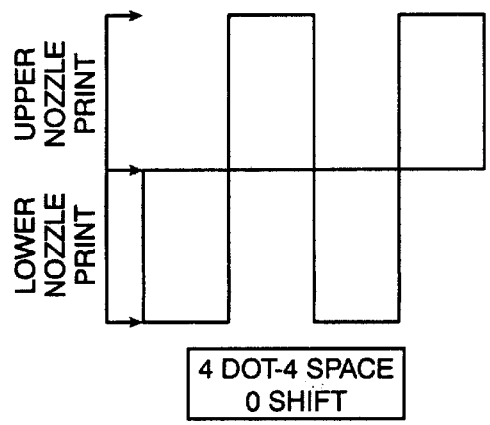
4 DOT-4 SPACE
0 SHIFT
FIG. 34E
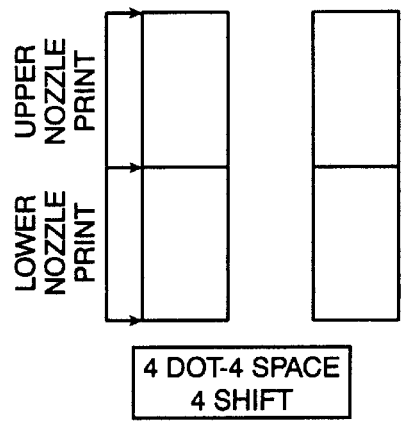
4 DOT-4 SPACE
4 SHIFT
FIG. 34F
FIG. 34

AUTO-ALIGNMENT SYSTEM FOR A PRINTING DEVICE

BACKGROUND OF THE INVENTION

1. Field of the Invention

The present invention relates to shuttle-type image printing devices which print characters and images on a print medium by scanning multiple printheads across the print medium. In particular, the invention provides for improved output from shuttle-type printing devices in which multiple printheads are disposed at a fixed distance from each other and wherein each printhead scans and prints over an assigned section of a print medium.

2. Description of the Related Art

Some conventional printing devices use full-line printheads, which are capable of simultaneously printing an entire line of data upon a print medium. Unfortunately, such printheads are quite expensive.

In contrast, serial printing devices operate by scanning a printhead across a print medium. The printhead forms images upon the print medium as it is scanned across. Such printheads are required to print only a small amount of data at any one time and are therefore generally less expensive than full-line printheads. Accordingly, serial printing is widely used in conventional printing devices.

Regarding color printing, several types of serial printing devices print color images by means of a print medium which itself generates color. Examples of such devices include a device in which heating elements on a thermal printhead heat special thermal paper, thereby generating color, and a device in which optical effects create color upon photo-sensitive paper.

On the other hand, various methods are used in which printheads transfer color ink onto print media. For example, in an impact printing method, ink ribbons contain liquid color ink which is transferred to a print medium when printing wires press the ribbons against the print medium. In thermal melt and sublimation transfer printing methods, heating elements on a thermal printhead heat solid ink on ink ribbon printheads and transfer the ink to a print medium. In an ink jet method, liquid ink is ejected onto a print medium.

Of the above examples, devices in which color ink is transferred onto print media are most widely used due to their ability to print color upon ordinary paper. Among these methods, ink jet printing has the advantages of low noise, lower operation cost, ease of miniaturization, ability to use ordinary paper, and ease of color printing. Hence, ink jet printing is widely used in various printing devices, such as printers and photocopiers.

In serial printing, a printhead can print on a relatively limited area at one time. This area is defined by printing elements, such as ink jet nozzles, located on the printhead. Accordingly, print speed is less than that of other printing methods, such as full-line or laser printing.

Many techniques have been introduced to attempt to increase the speed of serial printing. Examples include the use of a printhead having a wide printing swath (the width of an array of printing elements) and reduction of the scanning period by increasing carriage speed and printing frequency. Each technique, however, has accompanying limitations.

For example, a printhead having a wider printing swath is expensive because the precision required to manufacture such a printhead is not easily achieved by modern equipment. Moreover, wider printheads require larger print buffers, which are memory areas in which print data is temporarily stored.

With respect to methods in which heat is used to generate color on a print medium or to transfer ink to a print medium, a wider printhead generates more heat. The resultant higher temperature induces degradation or damage of printer components. Such degradation or damage must be prevented by some means.

In ink jet printing, liquid ink is propelled toward a print medium. Accordingly, a printhead having a wider printing swath causes more ink to be absorbed by a print medium and, as a result, the print medium cockles, or ripples. These ripples degrade print quality. No satisfactory methods to prevent such degradation have been proposed.

Where print speed is increased by increasing printing frequency, scanning speed must be increased correspondingly in order to maintain proper pixel density of image data. In this case, a larger load will be placed on a carriage motor. In addition, fast movements of the carriage shake the stored ink and thereby degrade print quality.

Japanese Laid-Open Patent Application Number 50-81437 and U.S. Pat. No. 4,272,771 disclose examples of methods to increase the print speed of serial image printing devices. According to these references, the left and right halves of each printed line are printed simultaneously. To achieve this feature, left and right printhead assemblies are provided, both of which are supported by a common carriage mechanism. Accordingly, print speed is approximately doubled over that of serial printing devices. Furthermore, these references suggest that further increases in print speed can be achieved by using more than two printhead assemblies or by printing in both the left and right scanning directions.

However, transverse and lateral registration between printheads becomes important in a printing device having multiple printheads which print on the same paper simultaneously. When the transverse registration is not adjusted correctly, there will be a transverse mismatch in the image printed by the left and right printheads. This mismatch is very noticeable at the boundary of the two areas printed by the left and right printheads. When the lateral registration is not properly adjusted, the two areas printed by the left and right printheads become separated or overlapped.

Therefore, ink jet nozzle adjustment for multiple printheads is necessary, not only for the above conventional example, but also for printing devices, such as a color printer, in which each of multiple printheads utilizes a different ink.

Bi-directional printing is another way of increasing print speed. In bi-directional printing, a serial printhead prints as it moves in each direction of its reciprocal scanning movement. Therefore, transverse and lateral printing positions corresponding to one of the reciprocal movements must match those of the opposite reciprocal movement.

In addition, in a structure where multiple printheads print on the same paper, ink density in a printing area assigned to one printhead may differ from that of assigned to another due to the difference in the characteristics of the printheads or other printer elements, such as inks or ink ribbons.

FIG. 1A and FIG. 1B illustrate this phenomenon. In FIG. 1A, two printheads, printhead 4A and printhead 4B, have printed within the section designated A and the section designated B, respectively. As shown, printhead 4B produces a more dense output than that of printhead 4A. The Figure illustrates the printing results for three printing duties, 25%, 50% and 100%. The Figure shows that, for each printing duty, the difference in print densities between section A and section B is very noticeable at the border between the two sections.

FIG. 1B illustrates similar printing results utilizing the same printheads while redefining section A and section B so as to add a small overlap between the two sections. Each printhead prints approximately half of the total print data in the overlapped printing area. Hence, the printing density of the overlapped area is greater than that of section A. However, the density is lower than that of section B. Therefore, in the case of FIG. 1B, the density differences are less noticeable than that shown in the above FIG. 1A, but are still obvious at both borders of the overlapped printing area. Accordingly, it is necessary to compensate for differences in print density caused by differences in output characteristics of utilized printheads.

Furthermore, in a printing device utilizing the above-described bi-directional printing method, density differences appear between bands (swathes) printed in one scanning direction and those printed in the other scanning direction, due to differences in printing characteristics in each direction.

Differences in printing characteristics arise because, in an ink jet printing device, ink jets propel satellite ink droplets in addition to main ink droplets. The relative location at which the satellite droplets land on a print medium with respect to that of the main droplets is different for one direction of the scanning motion than for the other. Hence, the area which is covered by ink differs in each direction. Therefore, print density needs to be compensated for with respect to the difference in the output characteristics in both directions.

In order to compensate for the above-described ink jet nozzle misalignments and density differences, one must initially determine the nature and degree of the ink jet nozzle misalignments and the density differences.

Conventionally, a measurement of these measurement objects relied on a visual judgment by a user or readout by optical sensors after printing test patterns. However, when a user makes adjustments using visual inspection and selections, problems occur because the adjustments turn out to be a burden on the user, or because a user does not make correct adjustments.

Accordingly, automatic measurement of measurement objects and subsequent adjustment is more desirable from the viewpoint of operability and reliability. However, extremely accurate sensors are needed to perform precise adjustments. In view of current technology, such accuracy is quite costly.

SUMMARY OF THE INVENTION

One purpose of the present invention is to provide a printer driver, an image printing device and a driving method which allow for easy acquisition of alignment and density information.

Another purpose of the invention is to provide a printer driver, an image printing device and a driving method which allow for easy measurement of printing location misalignment of one printhead or between two or more printheads.

A further purpose of the invention is to provide a printer driver, an image printing device and a driving method which allow for easy measurement of ink jet nozzle misalignment among multiple printheads.

Yet another purpose of the invention is to provide a printer driver, an image printing device and a driving method which allow for easy measurement of printing density differences caused by differences in output characteristics of one or multiple printheads.

Still another last purpose of the invention is to provide a printer driver, an image printing device and a driving method which allow for easy measurement of printing density differences caused by differences in output characteristics of multiple printheads.

In order to achieve the above purposes, this invention is characterized by a method in which a plurality of test patterns are printed, the density of each test pattern depending upon a measurement object, a relationship between image densities of a plurality of the printed test patterns is determined, and information on the measurement object is acquired based on the determined relationship.

In addition, this invention is characterized by a printer driver including codes to print a plurality of test patterns, the density of each pattern depending upon a measurement object, codes to determine a relationship between densities of a plurality of the printed test patterns using a sensor, and codes to acquire information on the measurement object based on the determined relationship.

Furthermore, this invention is characterized by a method for controlling a printing device using a scanning printhead to print upon a recording medium. This method includes printing a plurality of test patterns upon the recording medium, the density of each test pattern depending upon a measurement object, determining a relationship between image densities of a plurality of the printed test patterns using a sensor, and acquiring information on the measurement object based on the determined relationship.

Lastly, this invention is characterized by an image printing device which includes a printing device for printing a plurality of test patterns, the density of each test pattern depending upon a measurement object, a determination device for determining a relationship between image densities of a plurality of the printed test patterns, and an acquisition device for acquiring information on the measurement object based on the determined relationship.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 1, comprising FIG. 1A and FIG. 1B, illustrates uneven printing output in a case where multiple printheads are used in a conventional printing device having multiple printheads.

FIG. 7, comprising FIG. 7A to FIG. 7F, shows test patterns which are used for measurement of transverse misalignment.

FIG. 8A to FIG. 8D, shows test pattern density as a function of alignment.

FIG. 9A to FIG. 9J, shows density relationships between shifted and unshifted "one dot—one space" patterns for −2, −1, 0, 1, or 2 dot misalignment.

FIG. 10A to FIG. 10H, shows density relationships between shifted and unshifted "two dots—two spaces" patterns for 0 or 2 dot misalignment.

FIG. 11A to FIG. 11H, shows density relationships between 1-shifted and 3-shifted "two dots—two spaces" patterns for 1 or 3 dot misalignment.

FIG. 12, comprising FIG. 12A to FIG. 12H, shows various "four dots—four spaces" test patterns.

FIG. 14 is a table showing relationships between results of density comparison of various test patterns and an amount of transverse misalignment.

FIG. 15 is a table showing measured density values in a case of 2 dot transverse misalignment.

FIG. 16, comprising FIG. 16A to FIG. 16D, shows variously shifted "two dots—two spaces" test patterns.

FIG. 19 is a table showing relationships between results of density comparisons of the test patterns of FIG. 16A to FIG. 16D and an amount of transverse misalignment.

FIG. 20 is a table showing measured density values in a case of zero transverse misalignment.

FIG. 21A to FIG. 21D, show variously-shifted "eight dots—eight spaces" test patterns.

FIG. 22, comprising FIG. 22A to FIG. 22F, shows test patterns used to measure lateral misalignment.

FIG. 23, comprising FIGS. 23A to 23C, shows movement of printheads in the transverse direction due to reciprocal movements of the printheads.

FIG. 24A is a test pattern used to measure printhead output density ratios.

FIG. 24B shows total output density of the test pattern of FIG. 24A.

FIG. 24C is a graph showing the density relationship of the output of each printhead shown in FIG. 24A.

FIG. 26A is a test pattern to measure printhead output density ratios.

FIG. 26B shows total output density when the test pattern of FIG. 26A is used.

FIG. 26C is a graph showing the density relationship of the output of each printhead shown in FIG. 26A.

FIG. 28, comprising FIG. 28A and FIG. 28B, shows density of a test pattern.

FIG. 34, comprising FIGS. 34A to FIG. 34F, shows test patterns for measuring printhead misalignment.

DETAILED DESCRIPTION OF THE PREFERRED EMBODIMENTS

The foregoing embodiments of the present invention are described in view of the above-mentioned Figures.

(The first preferred embodiment)

Figure 2:
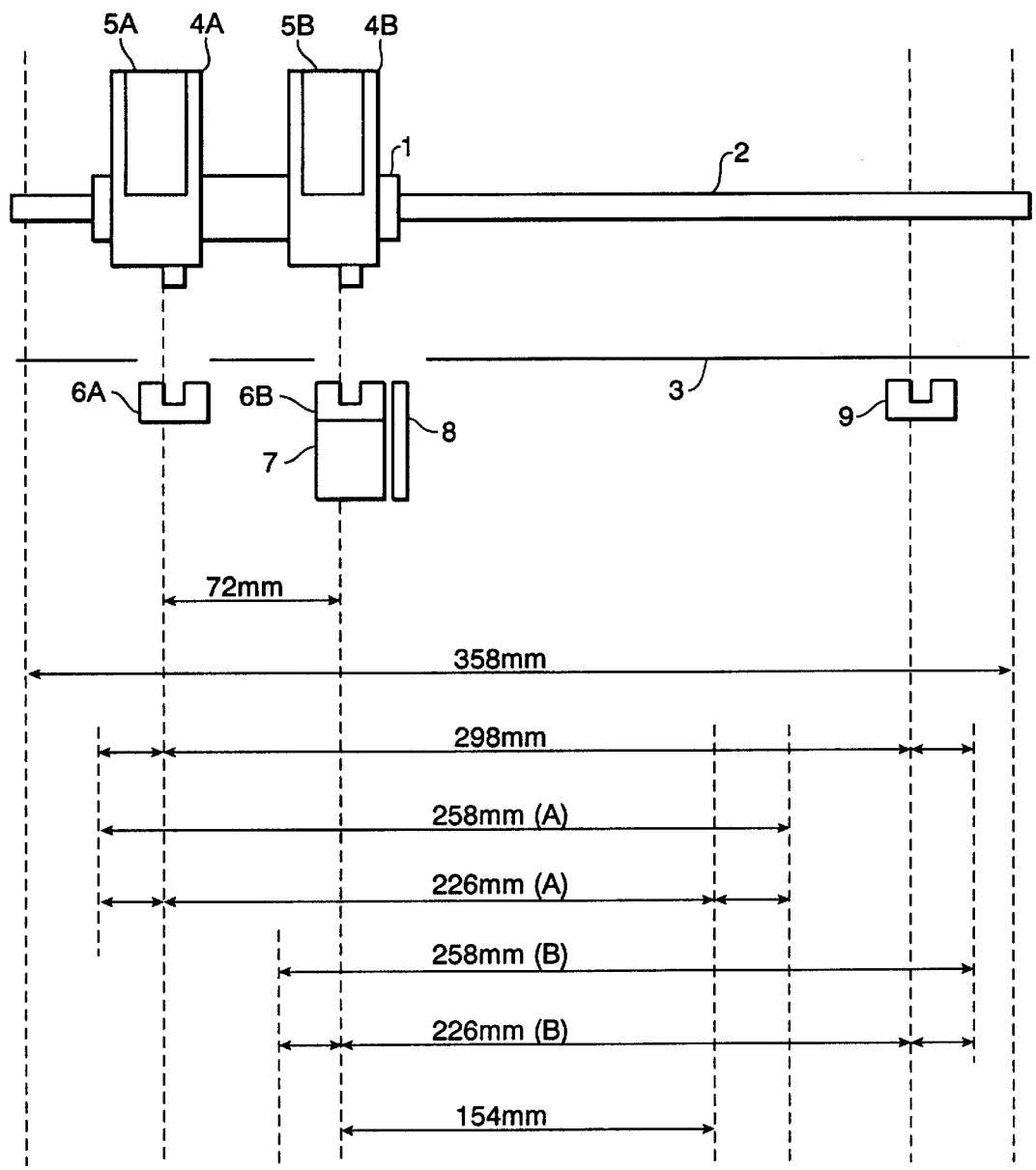
FIG. 2 illustrates regions of divided printing and overlapped printing in a case where two printheads are used in a printing device.

FIG. 2 shows printheads 4A and 4B mounted on carriage 1 at a separation of 72 mm. Printheads 4A and 4B support, respectively, ink tanks 5A and 5B. Ink stored in the tanks is provided to the printheads during printing. This design allows for independent installation and removal of each tank and each printhead on the carriage 1. Alternatively, a printhead and a tank can be formed as one unit, and the combined unit can be installed on and removed from carriage 1.

Carriage 1 is supported on guide rail 2 and can be moved freely by virtue of a drive mechanism, such as a drive belt. As a result, carriage 1 can be located anywhere within the scannable space, denoted by "358 mm" in FIG. 2. In addition, the ink jet nozzles of each of printhead 4A and 4B can be located anywhere within each of scanning areas "258 mm(A)" or "258 mm(B)" respectively. Excluding ramp up and ramp down areas, at which carriage 1 accelerates and decelerates, printhead 4A scans in its assigned printing area "226 mm(A)", and printhead 4B scans in its assigned printing area "226 mm(B)".

Caps 6A and 6B are used for the ink jet nozzles of printheads 4A and 4B, respectively, under a platen 3 within the scannable space of the carriage 1. The carriage 1 rests over the platen at a home position, whereat each ink jet nozzle is capped with either cap 6A or 6B. Pump 7 is connected to cap 6B and removes ink through cap 6B. Each of heads 4A and 4B travels to a position facing cap 6B sometime during operation therefore ink can be removed from either printhead using pump 7.

Wiper 8 is provided adjacent to cap 6B. Wiper 8 moves outward at a certain time into the path of one of the printheads and wipes ink jet nozzles of the printhead as it comes in contact with wiper 8. In addition, dummy ejection receptor 9 is provided on the opposite end of the scannable space of printhead 4A from "226 mm(B)" where cap 6A is located. Printhead 4B can travel to this position sometime during operation and perform a dummy ejection. Similarly, printhead 4A can perform a dummy ejection after it travels to a position facing cap 6A.

The foregoing arrangement maximizes the printable area within the scannable space.

In the above-described embodiment of a printing device, the printhead separation distance (72 mm), is preferably set to approximately one-quarter of the maximum printable area (298 mm). The printable area is maximized by dividing it into two scanning areas for each printhead. The width of the overlapped scanning area is 154 mm. These sizes are defined as follows. The width of A3-sized paper (297 mm×420 mm) is the width of the maximum printable area. The width of the overlapped scanning area corresponds to the width of A5-sized paper (148 mm×210 mm). Therefore, the width of the maximum printable area is defined at approximately twice that of the overlapped scanning area.

In this preferred embodiment, each of printheads 4A and 4B print on assigned printing areas, respectively, in a case where the instrument prints on A3-sized paper. In this case, both printheads preferably eject the same type of ink. On the other hand, when the printing instrument prints on A5-sized paper, which is the width of the overlapped printing area, one printhead may be replaced by a type of printhead which ejects ink with a lighter color so that ink with darker and lighter colors may be printed at areas of the page which can be accessed by both printhead 4A and printhead 4B.

Accordingly, the printing device of the embodiment of FIG. 2 can print faster over A3-sized print media than a printing device with one printhead because the work of printing over the maximum printable area is divided between two printheads. In addition, the size of the printing device of FIG. 2 is smaller than other devices having the same maximum printable area.

The design of this preferred embodiment benefits single color printing, such as black and white. However, when using multiple color inks for color printing, the benefits are more pronounced due to the ink-storage capacity of the ink tanks.

In this color printing embodiment, four color inks, black (Bk), cyan (C), magenta (M) and yellow (Y) are used. Four individually-replaceable tanks, one for each color ink, Bk, C, M or Y, are installed on the central portion of carriage 1 of FIG. 2. Each printhead is equipped with a group of ink jet nozzles, each of which ejects, respectively, Bk, C, M or Y ink. The four ink tanks supply color ink to both printheads. Even though this embodiment is designed to supply ink from common ink tanks to each printhead, applications of this invention are not limited to this design. For example, each printhead can be equipped with an exclusive ink tank and each tank can thereby form a single unit with its respective printhead. Also, such tanks can be made removable from the printheads.

Figure 3:
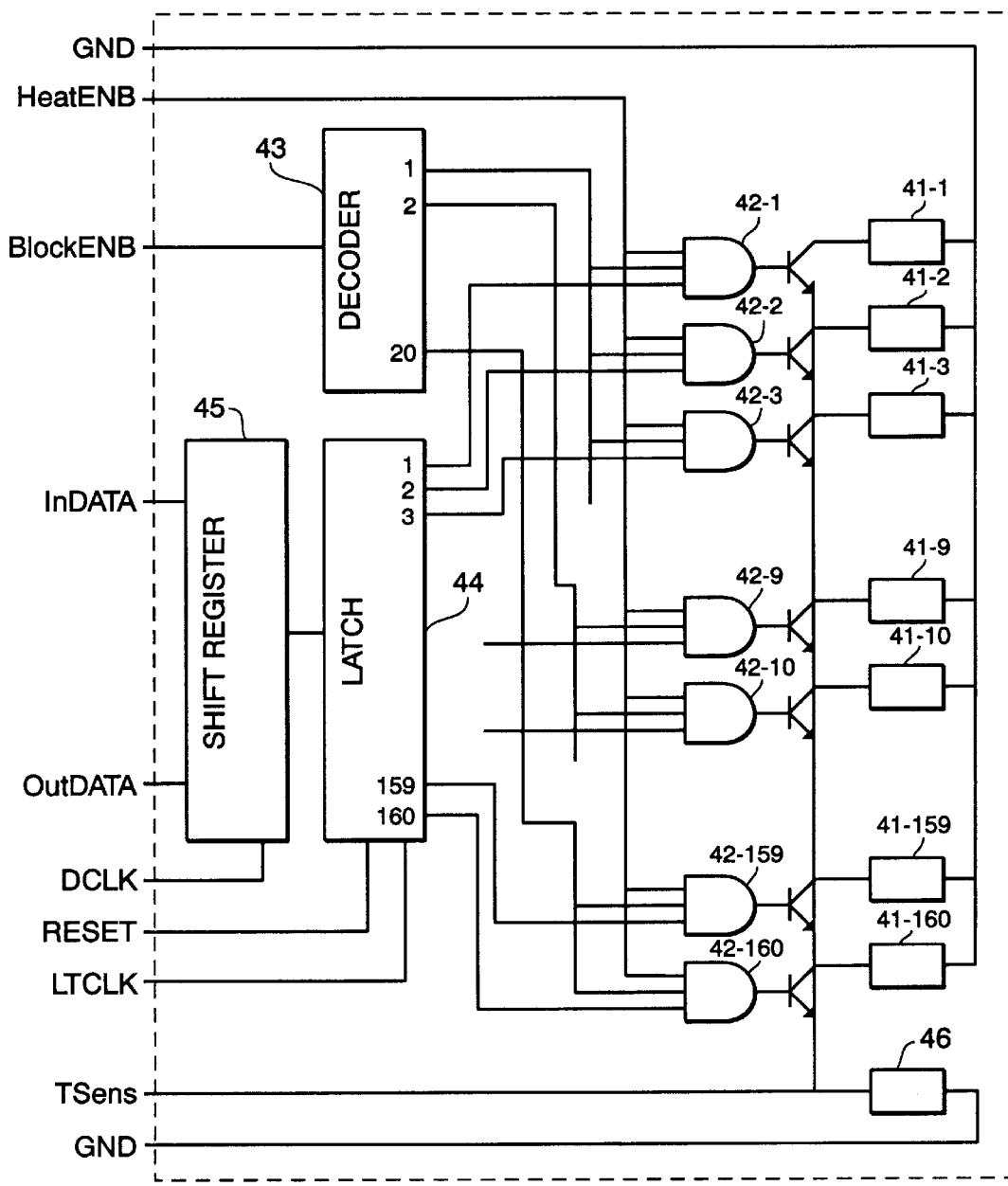
FIG. 3 is a block diagram of a driving circuit for use with the printheads used in the printing device of FIG. 2.

FIG. 3 is a block diagram for a heater driver of a printhead similar to printheads 4A and 4B. Heaters 41-1, 41-2, . . . , 41-160 each correspond to a respective ink jet nozzle used for a particular color ink. Accordingly, each nozzle may be individually heated. Here, 16 heaters are used for Y (yellow) nozzles, 24 for both M (magenta) and C (cyan), 64 for K (black), and a total (32 for four sets) of 8 nozzles disposed between each of these colors. When all of the heaters 41 are turned on at the same time, a large current flows and the load on the power supply increases. In addition, because voltage drops across the circuit impedance, the energy supplied to each of the heaters decreases. This may jeopardize normal printing functions.

Thus, a concern for the ill-effect on image quality also arises. Therefore, in this preferred embodiment, printheads are installed at a small angle, and the well-known method of time-sharing driving is used for heater control. Under this time-sharing driving method, heaters are grouped into blocks, each of which contains the same number of heaters. In addition, the image data and print timing are adjusted block by block for ink ejection.

Various ways of realizing the time-sharing driving method are proposed and implemented. Any of these methods can be used. In this preferred embodiment, color ink jet nozzles are divided into 20 blocks. Each block contains 8 ink jet nozzles. These ink jet nozzles include 8 ink jet nozzles for mixed colors. Each block ejects ink sequentially, one after another, with a certain constant interval. The printheads are installed at an angle in order to compensate for the scanning speed of the printheads and the ejection time differences among the ink jet nozzle blocks. The angled installation of the printheads prevents the ejection time differences among the ink jet nozzle blocks from causing a straight line to be slanted.

During printhead operation, ink is provided via shared liquid chambers located behind the ink paths leading to the nozzles. One liquid chamber is provided for each ink color. Ink is supplied from the shared liquid chambers through ink supply pipes to ink tanks 5A and 5B.

A heater 41 and electrical wires are installed on the ink path leading to each ink jet nozzle. Heater 41 is a thermo-electrical converter which generates thermal energy for ink ejection. The electrical wires supply power to heater 41. Heater 41 and the electrical wires are formed on a substrate such as a silicon wafer using thin film technology. A protective film is formed on heater 41 so that heater 41 does not come into direct contact with ink. Furthermore, the ink jet nozzle, ink path and shared liquid chamber are formed by stacking walls made of material such as resin and glass.

Once heater 41 heats the ink inside a nozzle to boiling, bubbles are formed within the ink. The bubble formation increases pressure within the ink jet nozzles, and the increased pressure causes ink droplets to be ejected toward a print medium. An ejected ink droplet for each color weighs approximately 40 ng. This printing method is generally called bubble jet printing.

AND gates 42-1 to 42-160 logically multiply a selection signal from decoder 43, driving data from latch circuit 44 and a heat enable signal (Heat ENB). The selection signal is used in the time sharing process and the heat enable signal dictates the driving time. A shift register 45 converts serial image data input signals into parallel signals and outputs the resulting driving data to the latch circuit 44. The resulting output signal is transmitted to respective heater 41.

Temperature sensors 46 are provided on printheads 4A and 4B in this preferred embodiment. The sensors monitor the respective temperatures of printheads 4A and 4B. Generally, optimum driving conditions for the printheads are determined depending on the temperatures of printheads 4A and 4B. A protective mechanism is operated which is also based on the temperature information. Each of these provisions improve the stability of the printing characteristics.

Figure 4A:
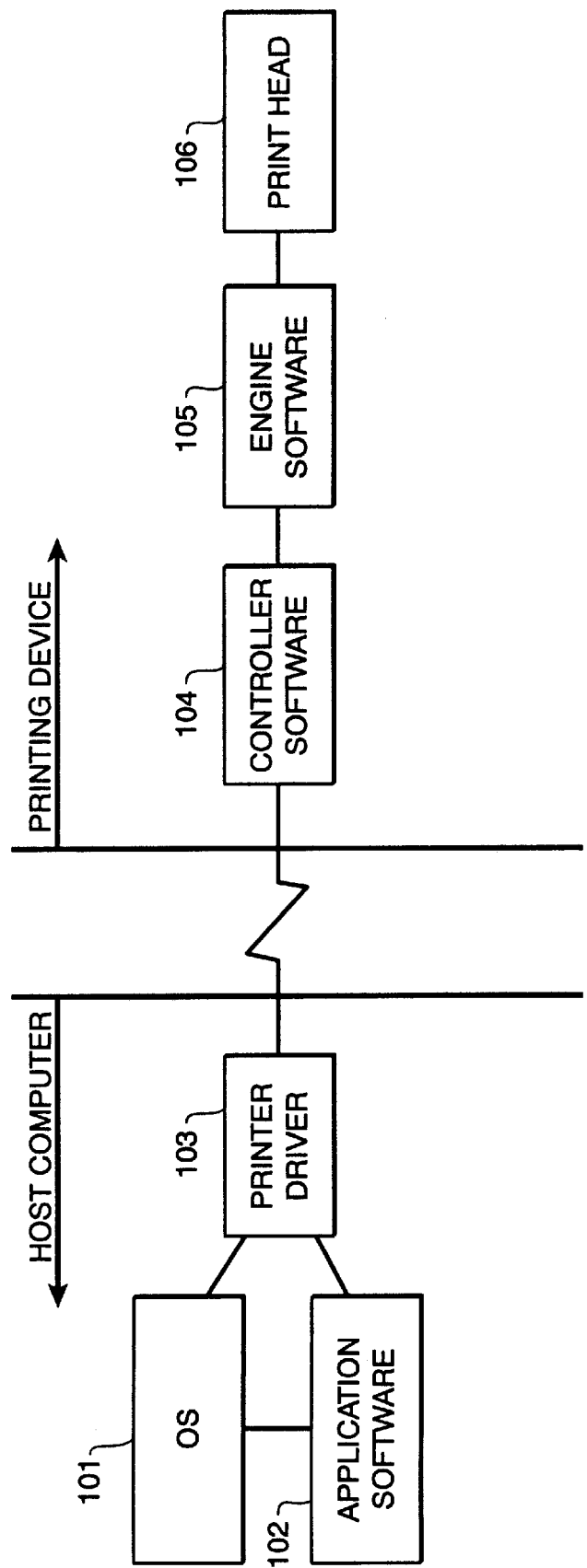
FIG. 4A shows a system configuration which illustrates the interface between a printing device and a host computer.

FIG. 4A shows a system which comprises a printing device and a host computer which functions as a hosting instrument. In the host computer, various data processing is performed by OS (Operating System) 101 in conjunction with application software 102. In operation, image data is generated by application software 102 and printer driver 103 outputs the image data to the printing device.

The image data is sent to printer driver 103 as multiple-level RGB data. After half-tone processing, the data is usually converted into binary CMYK data. The host computer then outputs the converted image data through a host computer/printing device interface or a file storage device interface. In the instance shown in FIG. 4A, the image data is output via a printing device interface.

The printing device receives the image data under the control of controller software 104, checks items such as printer mode and compatibility with printheads 106, and transfers the image data to engine software 105. Engine software 105 interprets the received image data as having the print mode and the data structure as instructed by the controller software 104 and generates pulses for the ink jet nozzles based on the image data. The pulses are sent to printheads 106. Printheads 106 use the pulses to eject color ink which corresponds to the pulses and to thereby print a color image on a print medium.

Figure 4B:
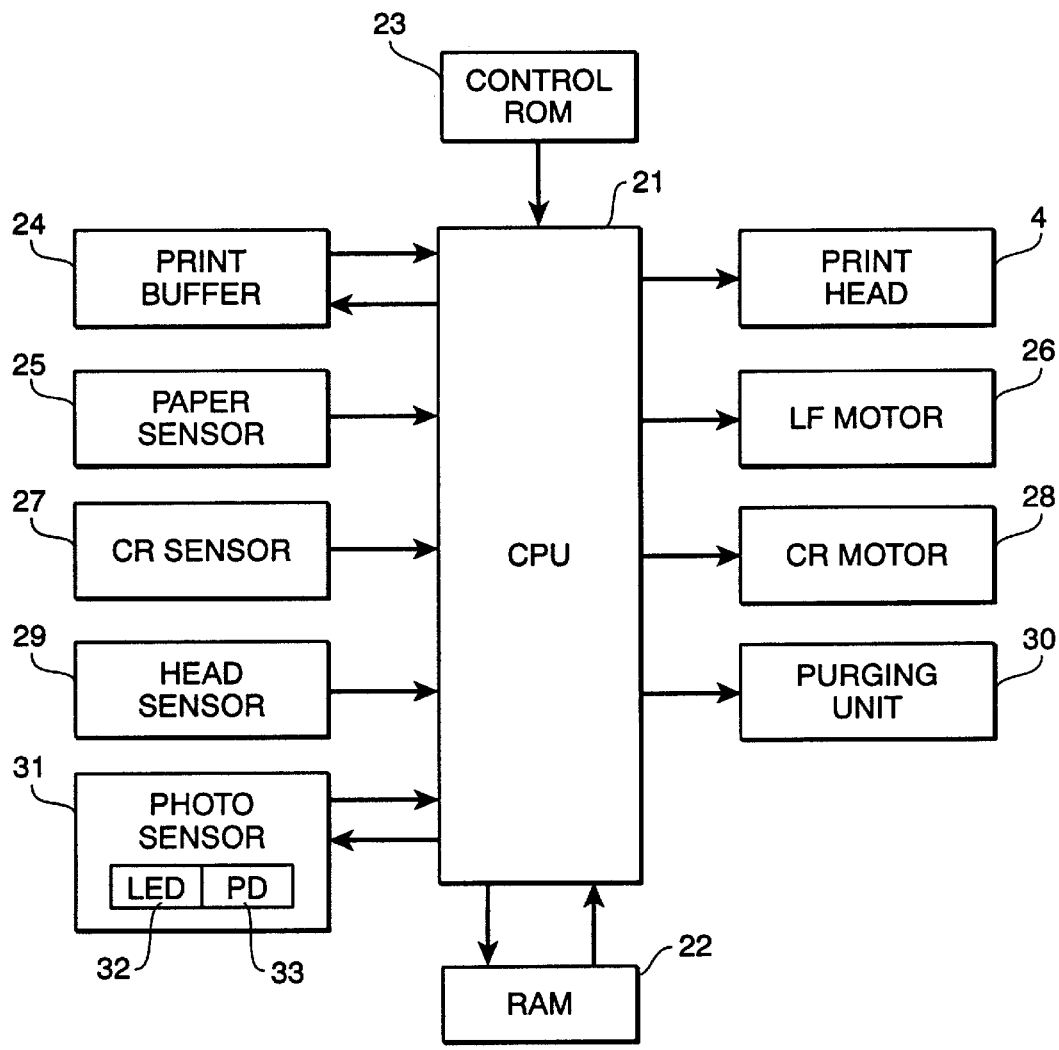
FIG. 4B is a block diagram of a controller for a printing device in accordance with the present invention.

FIG. 4B shows a block diagram of the printing device of FIG. 4A. Image data to be printed is transmitted into a receiving buffer in the printing device. In addition, data to acknowledge the correct receipt of image data by the printing device and data to show the operational status of the printing device are sent from the printing device to the host computer. The data in the receiving buffer is controlled under the management of CPU 21, stored temporarily in print buffer 24, and given to printheads 4A and 4B as print data.

Based on the information from paper sensor 25, CPU 21 sends commands to a paper forwarding mechanism. The paper forwarding mechanism, such as line feed motor 26, controls mechanical drivers such as paper forwarding rollers or line feed rollers based on commands from CPU 21. CPU 21 also sends commands to carriage-return driving mechanism 28 based on information from carriage return sensor 27. The carriage return mechanism 28 controls a carriage-driving power supply and thereby controls the movements of carriage 1. Purging unit 30 protects printheads 4A and 4B and optimizes the driving conditions, using commands from the CPU 21. CPU 21 sends such commands based on information sent by printhead sensor 29. Printhead sensor 29 comprises many sensors, for example, sensors such as those used to determine whether or not ink is present.

Commands from CPU 21 to photosensor 31 activate LED 32. Light from LED 32 subsequently reflected by test patterns on a print medium is then detected by photodiode 33.

In this preferred embodiment, print heads 4A and 4B print over the divided left and right printing areas, respectively. If printheads 4A and 4B are misaligned in the left-right direction (horizontal, lateral) or in the up-down direction (vertical, transverse), a printed image will reflect the misalignment.

Figure 5:
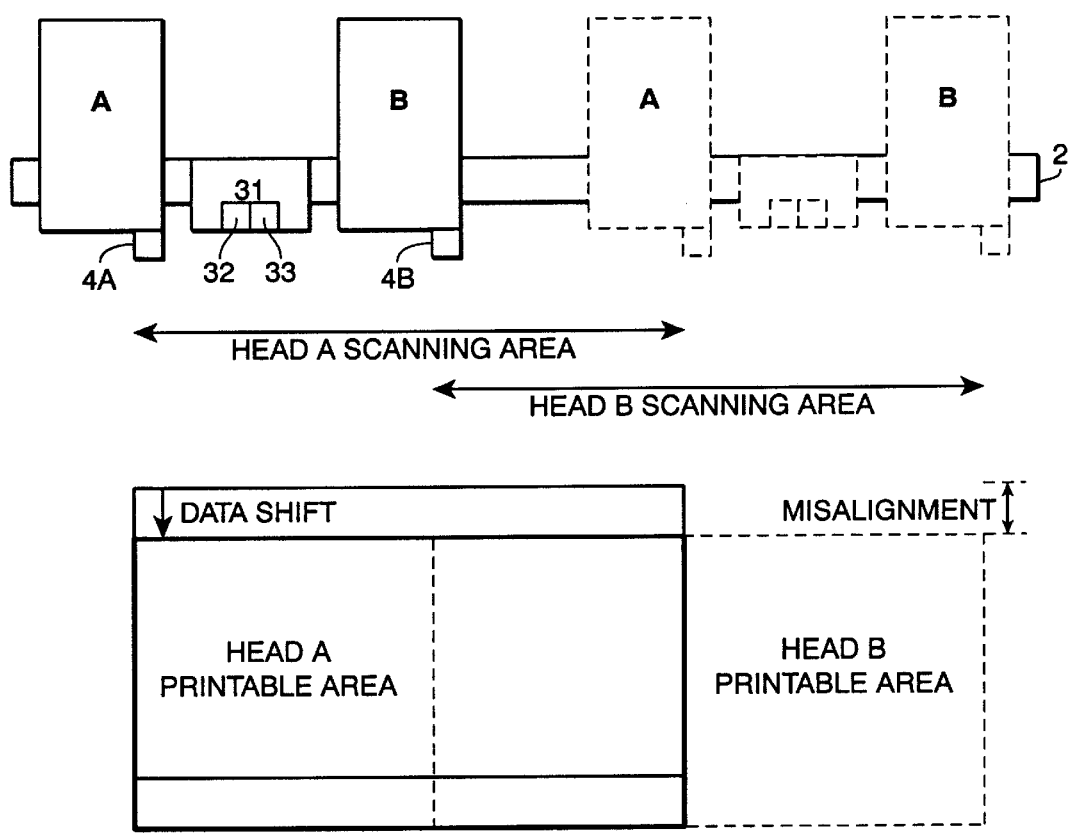
FIG. 5 is a view for describing transverse misalignment between printheads and a method to compensate for such a misalignment.

FIG. 5 illustrates an example of transverse ink jet nozzle misalignment between printheads 4A and 4B. The solid lines show the printheads 4A and 4B when they move to the left end and the broken lines represent the printheads when they move to the right end.

In this preferred embodiment, an amount of lateral and transverse misalignment of printheads 4A and 4B is measured. Next, portions of the original image are shifted by distances which correspond to the amount of misalignment. Thus, a correct printing image is obtained.

In FIG. 5, the transverse ink jet nozzle misalignment between printheads 4A and 4B is corrected by shifting the image data for printhead 4A from the image data shown by the thin solid line to the thicker solid line. Accordingly, the output of printhead 4A becomes transversely aligned with the output from printhead 4B, shown by the broken line.

Figure 6:
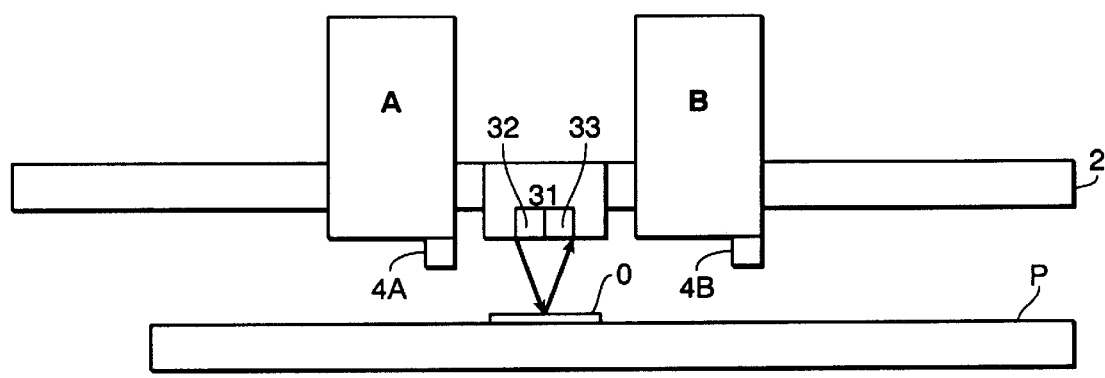
FIG. 6 is a representative view for explaining the operation of a measurement sensor.

FIG. 6 generally demonstrates one aspect of a method for compensation of transverse ink jet nozzle misalignment between printheads 4A and 4B. As shown, test patterns are printed in an overlapped printing area O on a paper P by left and right printheads 4A and 4B, and the density of the printed patterns is measured by sensor 31.

FIG. 7 shows various test patterns. The first set of test patterns are constructed by having each printhead print, alternatively, a "one dot—one space", "two dots—two spaces", or "four dots—four spaces" image (FIG. 7A, FIG. 7C and FIG. 7E). A corresponding set of patterns is created by transversely shifting the output of one printhead for each of the above patterns by one, two, and four pixels, respectively (FIG. 7B, FIG. 7D and FIG. 7F).

The density of the printed test patterns is measured by sensor 31. The location of the sensor measurement is shown in each pattern of FIG. 7. As shown, the ink coverage ratio (area factor) per unit area between the patterns having a shift and the patterns without a shift is quite different. Hence, even if a sensor with a poor sensitivity is used, the relative differences in coverage are easily detected. Furthermore, a user can easily notice the differences visually.

Figure 8:
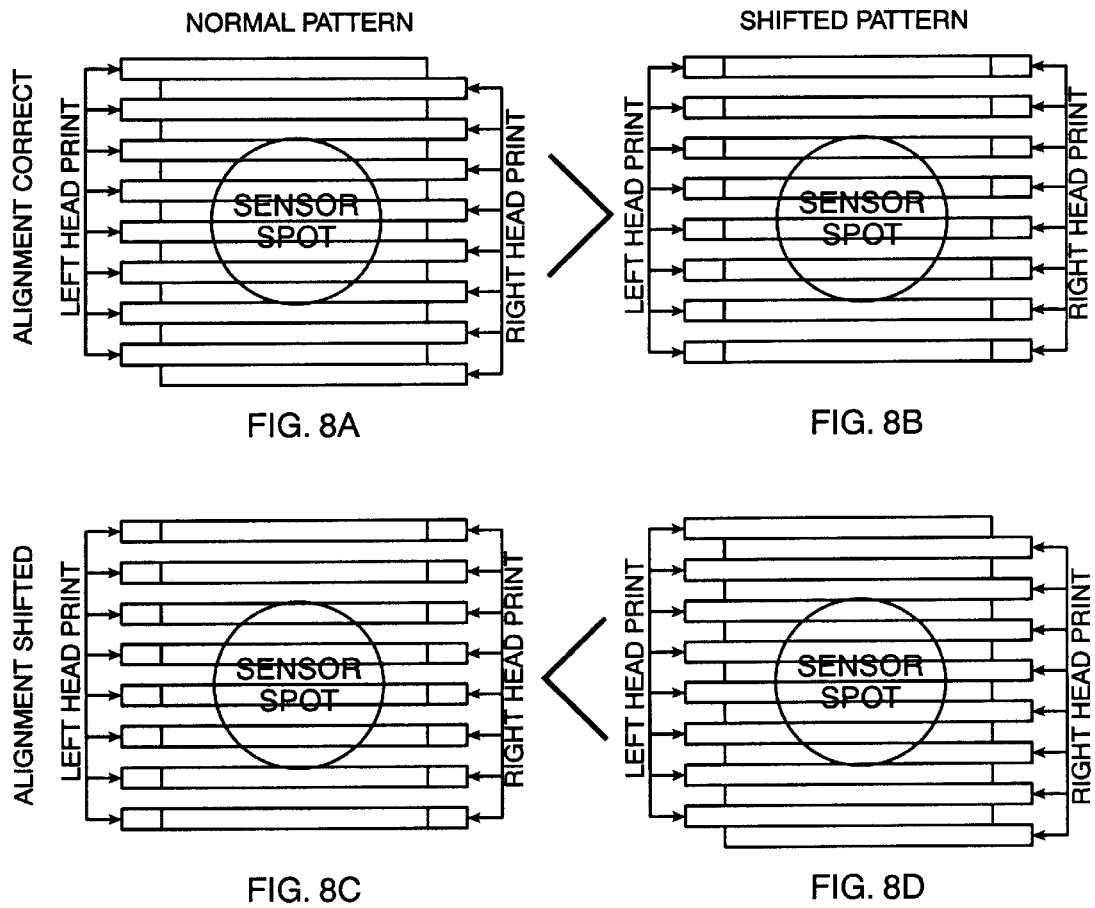
FIG. 8, comprising

In particular, and as shown in FIG. 7, patterns without a shift (normal data) have a higher density than those with a one-, two- and four-pixel shift in cases where the transverse positions of the left and right printheads are aligned. FIG. 8A and FIG. 8B illustrate this phenomenon.

On the other hand, when the transverse positions of the left and right printheads are not aligned, the patterns with a one, two, and four pixel shift have a higher density than those without a shift, as illustrated in FIG. 8C and FIG. 8D.

Below, the measurement of transverse ink jet nozzle misalignment is explained by referencing the flowchart shown in FIG. 13A. The logic shown in this flowchart is preferably controlled by controller software 104 of the printing device.

Figure 13A:
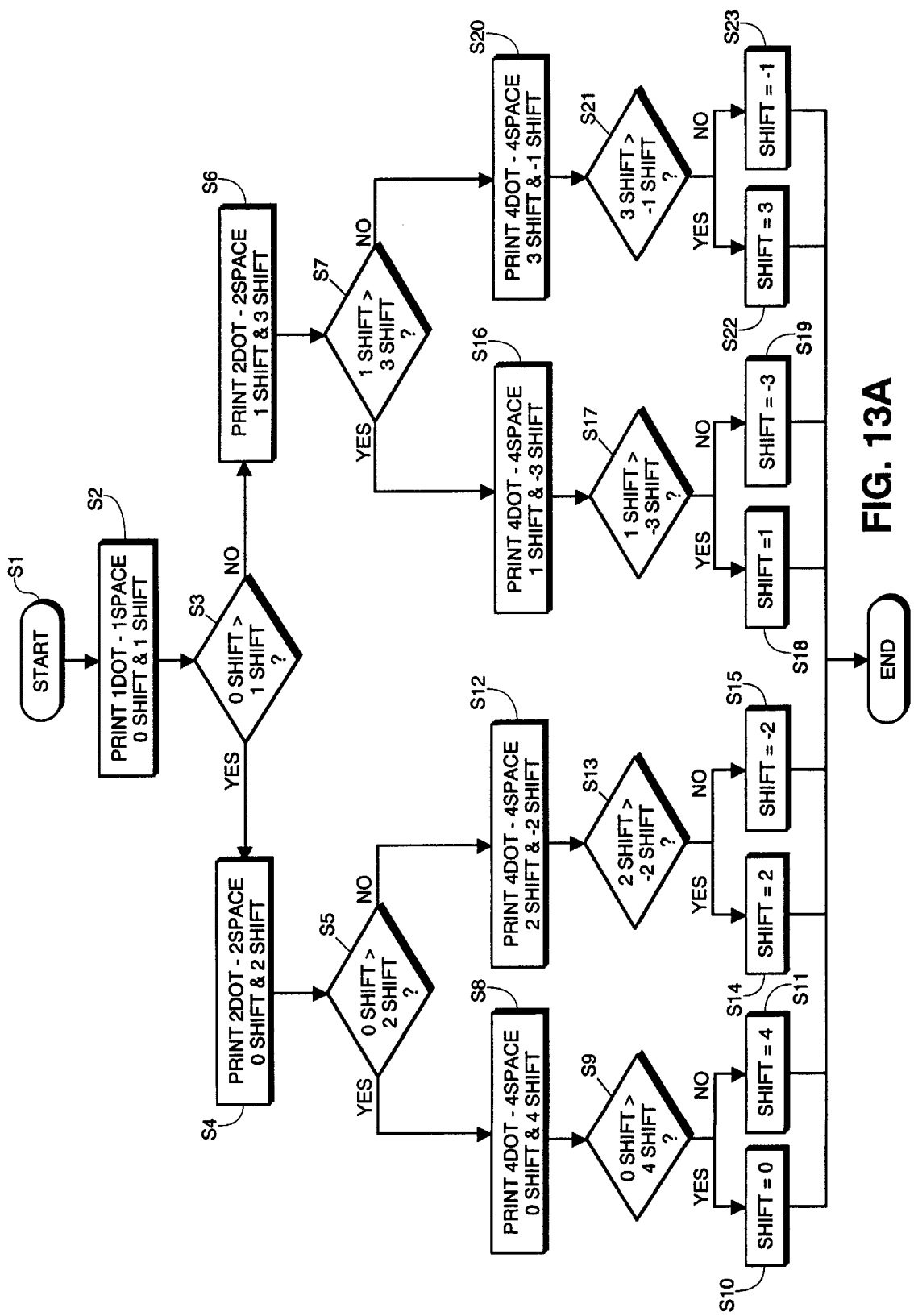
FIG. 13A is a logical flowchart for measuring an amount of transverse misalignment.

First, "one dot—one space" test patterns, having zero pixel shift and 1 pixel shift are printed (Steps S1 and S2 in FIG. 13A). The densities of the two printed "one dot—one space" test patterns are measured by sensor 31 and the densities of the two are compared (Step S3 in FIG. 13A).

The results of the step S3 measurement will be discussed using FIG. 9A to FIG. 9J. The Figures illustrate cases where the patterns with and without a one pixel transverse shift are printed by left and right printheads having transverse ink jet nozzle misalignments of −2 to 2 pixels.

When the amount of transverse ink jet nozzle misalignment between left and right printheads 4A and 4B is −2, 0 or 2 (2n, n=. . . , −1, 0, 1, . . .), the pattern without a shift has a higher density than that with a shift for all 2n, as shown in FIG. 9A, FIG. 9B, FIG. 9E, FIG. 9F, FIG. 9I, and FIG. 9J. When the amount of transverse ink jet nozzle misalignment between left and right printheads 4A and 4B is −1 or 1 (2n+1), the pattern with a shift has a higher density than that without a shift for all 2n+1, as shown in FIG. 9C, FIG. 9D, FIG. 9G and FIG. 9H.

Figure 9:
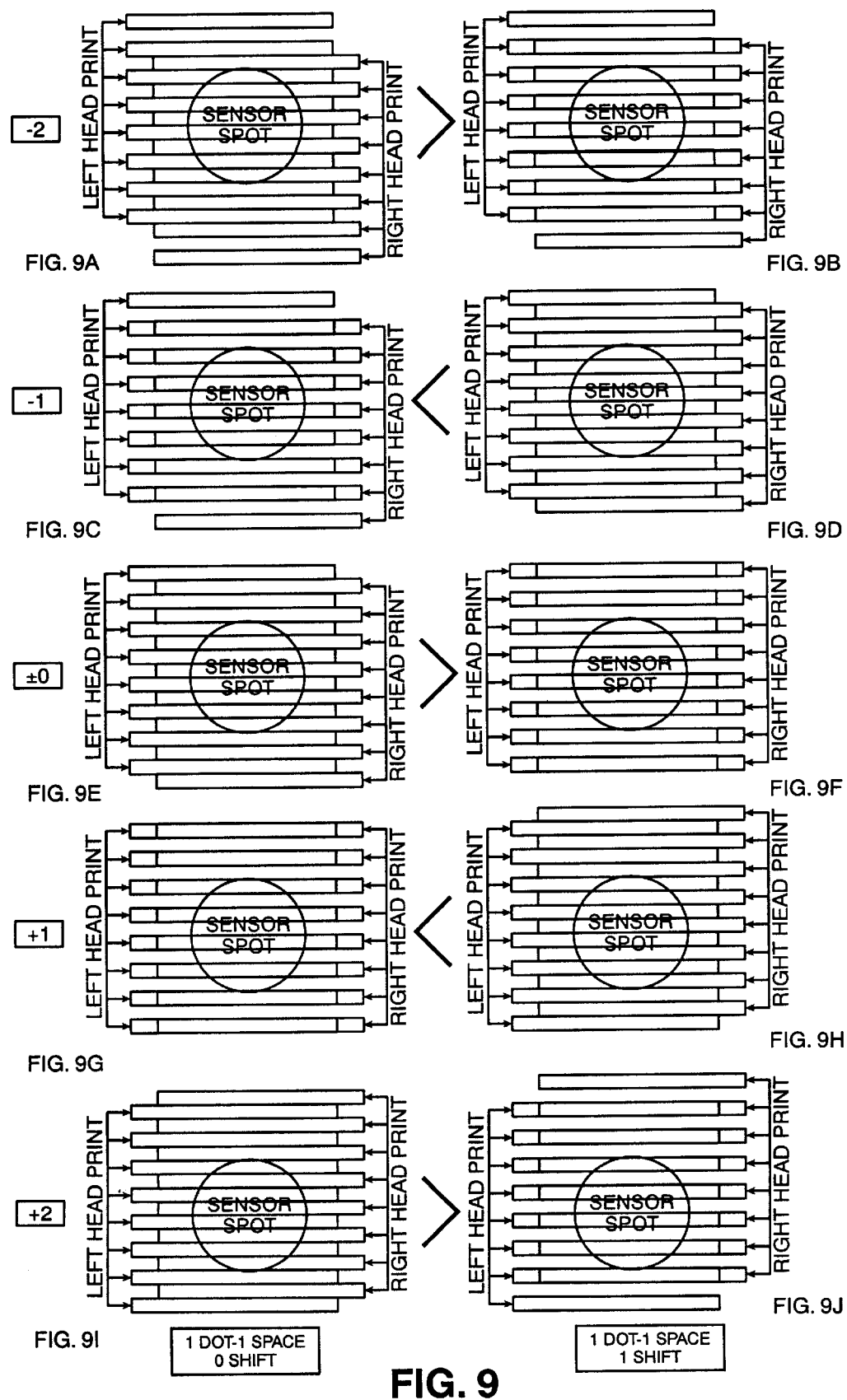
FIG. 9, comprising

Therefore, density comparisons using a "one dot—one space" test pattern do not differentiate between all of the different cases shown in FIG. 9. Rather, density comparisons using a "one dot—one space" test pattern can determine whether the misalignment between left and right printheads 4A and 4B is of an even number of dots (2n) (including zero misalignment), or of an odd number of dots (2n+1).

Hence, in this preferred embodiment, the amount of misalignment between left and right printheads 4A and 4B is measured by combining the density measurement results using "two dots—two spaces" and "four dots—four spaces" test patterns. With density comparisons using the "two dots—two spaces" test patterns, the misalignment amount can be measured by units of two dots. With density comparisons using the "four dots—four spaces" test patterns, the misalignment amount can be measured by units of four dots.

Different "two dots—two spaces" test patterns are prepared depending on the measurement results from the "one dot—one space" test patterns performed in the previously described steps.

Figure 10:
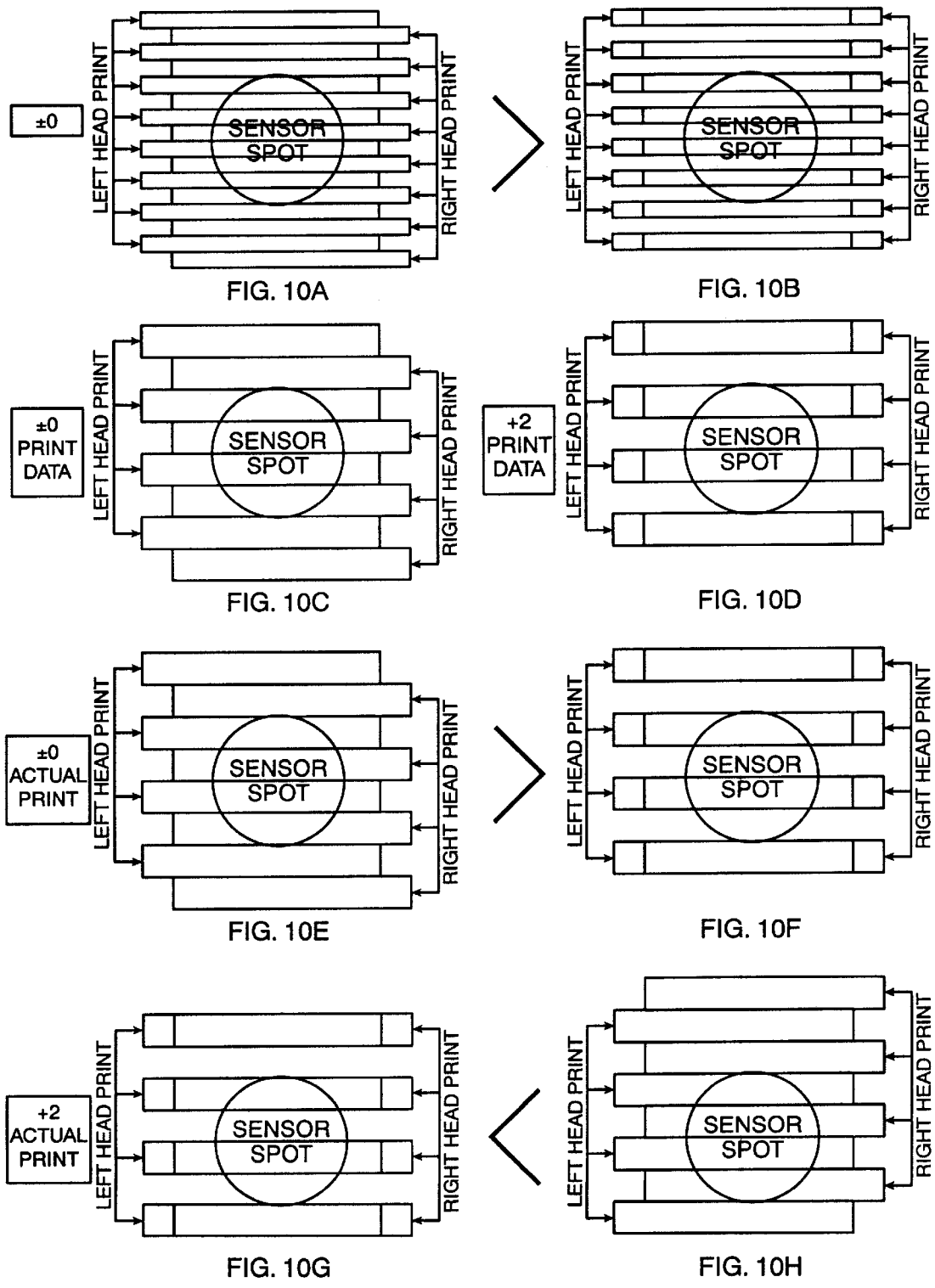
FIG. 10, comprising

For example, in a case where the preceding results indicate that the misalignment amount is of an even number of dots, as in the situation depicted in FIG. 10A and FIG. 10B (Yes in Step S3 in FIG. 13A), then "two dots—two spaces" patterns with and without a two pixel transverse shift are used, as shown in FIG. 10C and FIG. 10D (Step S4 in FIG. 13A). When the misalignment amount is 0 or 4 (4n), the unshifted pattern has a higher density than that having the two pixel shift, as shown in FIG. 10E and FIG. 10F (Yes in Step S5 in FIG. 13A). When the misalignment amount is 2 or −2 (=4n+2), an image having the two pixel shift has a higher density than that without the shift, as shown in FIG. 10G and FIG. 10H (No in Step S5 in FIG. 13A).

Figure 11:
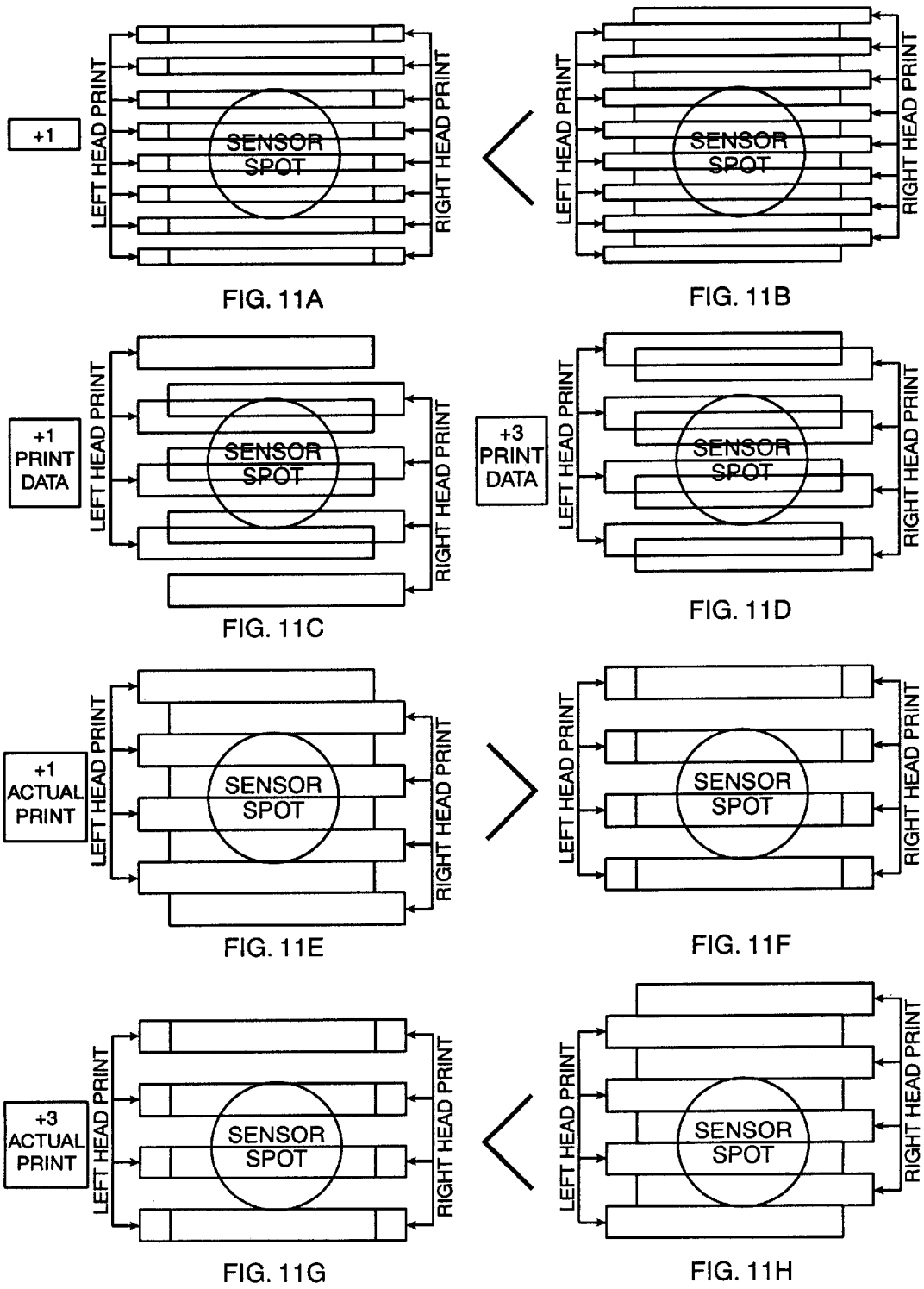
FIG. 11, comprising

On the other hand, if step S3 indicates that the misalignment amount is of an odd number of dots, as shown in FIG. 11A and FIG. 11B, then "two dots—two spaces" test patterns having a one and a three pixel transverse shift are printed, as shown in FIG. 11C and FIG. 11D (Step S6 in FIG. 13A). (For the three-pixel shift, a one-pixel shift in the reverse direction is used.) If the misalignment amount is 1 or −3 (=4n+1), the pattern having the one pixel shift has a higher density than that having the three-pixel shift, as shown in FIG. 11E and FIG. 11F (Yes in Step S7 of FIG. 13A). If the misalignment amount is 3 or −1 (=4n+3), the pattern having the three pixel shift has a higher density than that having the one pixel shift, as shown in FIG. 11G and FIG. 11H (No in Step S7 of FIG. 13A).

Next, based on the results of step S5 or S7 of FIG. 13A, different "four dots—four spaces" test patterns are prepared. For example, when the preceding results indicate that the misalignment amount is of 4n dots (Yes in step S5), then patterns with and without a four-pixel transverse shift are used, as shown in FIG. 12A and FIG. 12B (Step S8 in FIG. 13A). If the pattern without the shift has a higher density than that with the four pixel shift (Yes in Step S9 in FIG. 13A), it is determined that the misalignment amount between two printheads 4A and 4B is 0 (Step S10). Otherwise, it is determined that the misalignment amount is 4 (Step S11).

The remaining branches of the flowchart progress similarly. For example, if the preceding results indicate that the misalignment amount is of 4n+1, 4n+2, or 4n+3, (Yes in Steps S12, S16, and S20, respectively) then corresponding patterns are used, as shown in FIG. 12C and FIG. 12D, FIG. 12E and FIG. 12F, or FIG. 12G and FIG. 12H, respectively. As in the case with the misalignment amount of 4n, the densities of the pair of test patterns are compared (Step S13, S17 or S21), and the comparison results determine the misalignment amount (Step S14, S15, S18, S19, S22 or S23).

In the above case, the test patterns are stored in the printing device. The amount of transverse ink jet nozzle misalignment is obtained by the above method, and the adjustment is performed by shifting part of the original image in the transverse direction based on this misalignment amount. Original images can be adjusted by a transverse shift in a printer driver after sending the determined misalignment amount to the printer driver. Next, lateral ink jet nozzle adjustment is performed.

FIG. 14 shows the relationship between the results of density comparison of the test patterns and the amount of transverse misalignment. The relationships shown in FIG. 14 directly reflect the presumptions used in the flowchart of FIG. 13A.

FIG. 15 is a table showing measured density values in a case of 2 dot transverse misalignment. In FIG. 15, the density values are measured in terms of V (volts), with the greater V value corresponding to the greater density.

As shown in FIG. 15, low resolution sensor 31 in this preferred embodiment detects a clear density difference between the two test patterns of the "two dots—two spaces" and the "four dots—four spaces" arrangements. However, the detected difference is only 0.02 V for the "one dot—one space" patterns.

It is considered that the output density differences for the "one dot—one space" patterns may be undetectable for certain characteristics of inks and paper such as ink smears on regular paper. Accordingly, in some cases, correct results cannot be obtained and alignment adjustment cannot be performed.

A method for accurately detecting density differences even when a sensor outputs minuscule differences for the "one dot—one space" patterns is explained below, using the flowchart in FIG. 18A as a reference. The logic in this flowchart is followed under the control of controller software 104 of the printing device.

In steps S31 and S32, four "two dots—two spaces" test patterns are formed, each having transverse misalignment amounts of 0, 1, 2 or 3 pixels between the left and right printheads 4A and 4B. Such patterns are shown in FIG. 16A, FIG. 16B, FIG. 16C and FIG. 16D.

When the misalignment amount is 0 or 4 (=4n), the patterns actually printed are identical to those shown in FIG. 16A, FIG. 16B, FIG. 16C and FIG. 16D. In theory, when the misalignment amount is 1 or 3 pixels, one pixel-wide white lines should appear in the patterns. However, in practice, white lines are almost non-existent due to ink smears on the paper. As for patterns actually formed when misalignment is 2 pixels, white lines appear, although obscured due to ink smearing.

Therefore, white lines reliably appear in such printed test patterns only for misalignment amounts of 2 pixels (4n+2). As a result, when the above four test patterns are measured by sensor 31, the density of the patterns for a misalignment amount of 2 pixels is lower than that of images for misalignment amounts of 0, 1, and 3 pixels.

Figure 17:
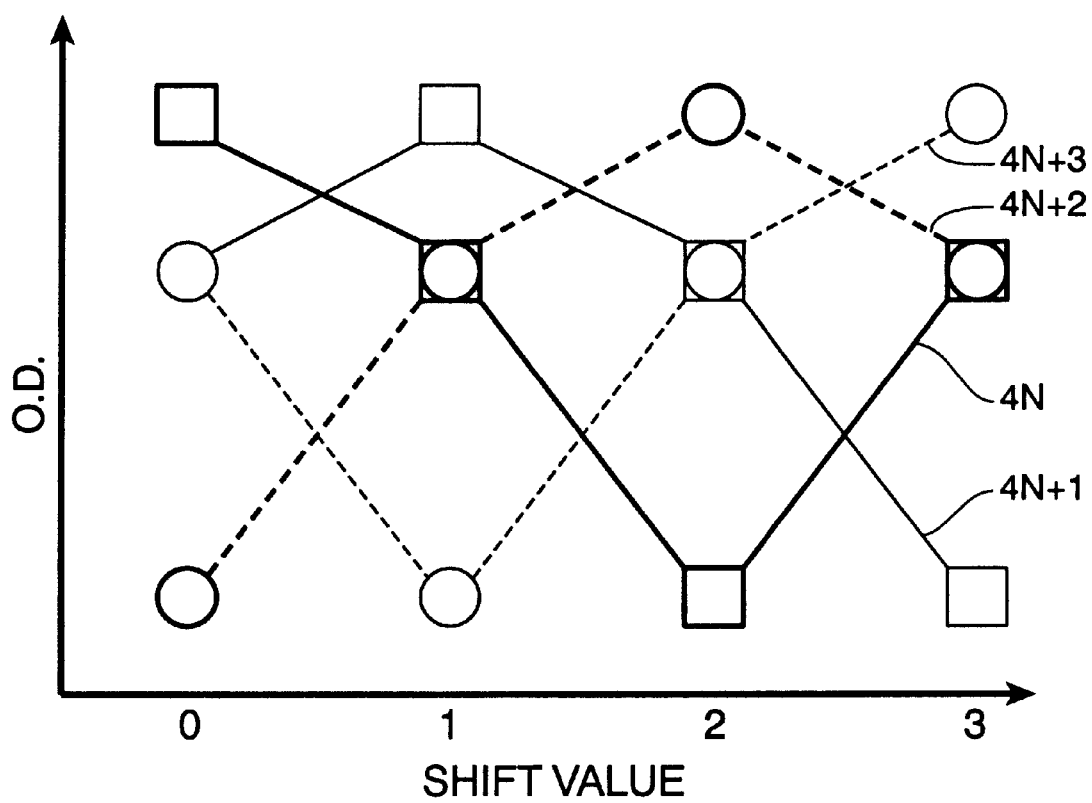
FIG. 17 is a graph illustrating relationships between densities of the test patterns of FIG. 16A to FIG. 16D and an amount of transverse misalignment.

As shown in FIG. 17, in cases where the misalignment amount is 1, 2 or 3 pixels, the lowest density is found for test patterns having 3, 0 and 1 pixel shift, respectively. Thus, the amount of misalignment (either 4n, 4n+1, 4n+2, or 4n+3) can be determined by determining which of the four test patterns of FIG. 16 gives the lowest density.

Figure 18A:
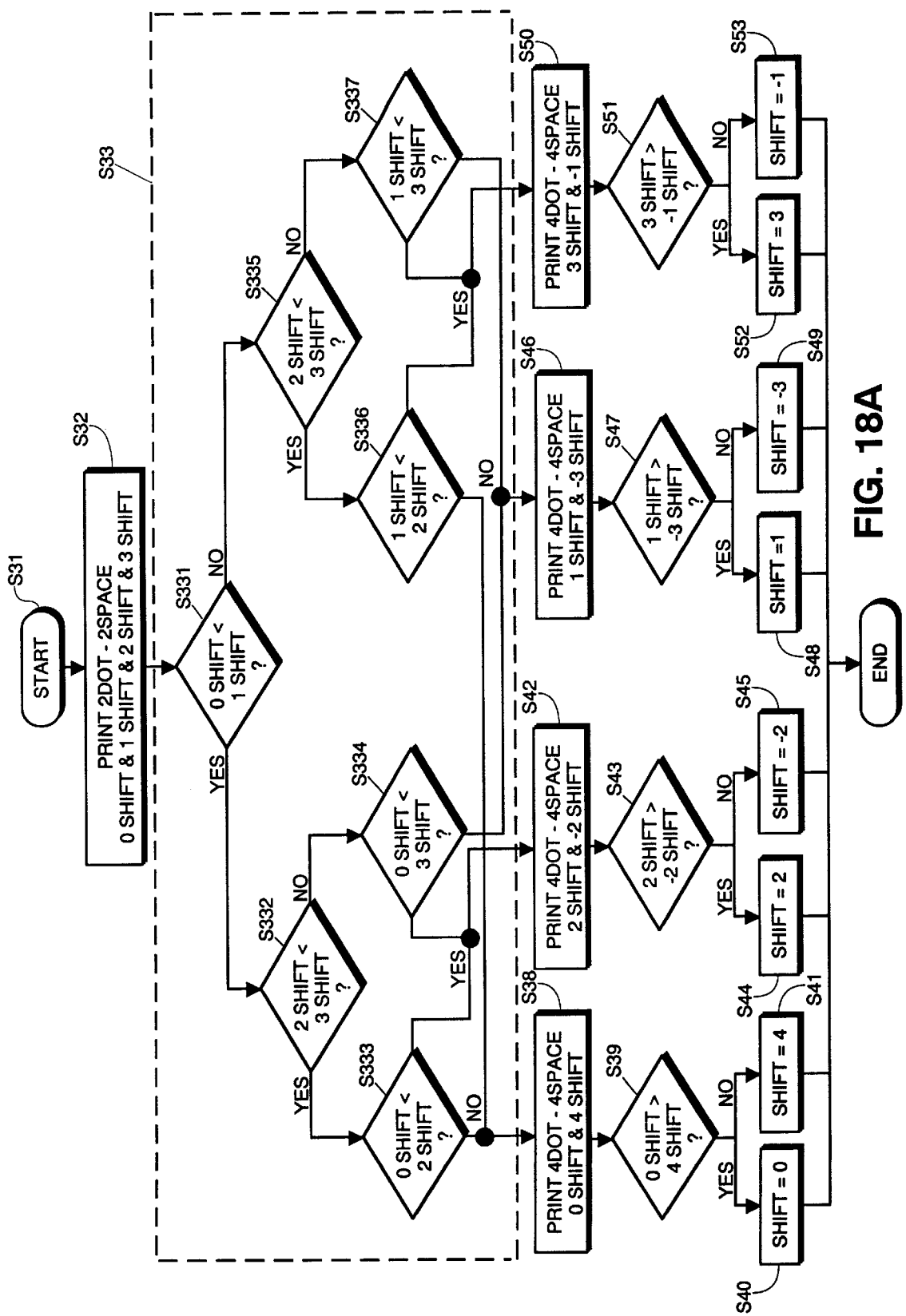
FIG. 18A is a logical flowchart for measuring transverse misalignment.

Step S33 in FIG. 18A detects which of the four test patterns gives the lowest density. Step S33 comprises substeps S331 to S337 and employs an algorithm to find the test pattern having the lowest density by systematically comparing the densities of each printed test pattern.

When the misalignment amount is found to be 4n, 4n+1, 4n+2, or 4n+3 from the measurement results of step S33, then the same "four dots—four spaces" test patterns as shown in FIG. 12 are used. FIG. 12 was explained previously. The selection of patterns are based on the results of step S33. Subsequent processing steps S38 to S53 are the same as steps S8 to S23 in FIG. 13A. In these steps, densities of two test patterns are compared and the results determine the misalignment amount.

FIG. 19 shows the relationship between the results of density comparison of the test patterns and the amount of transverse misalignment. The relationships shown in FIG. 19 directly reflect the presumptions used in the flowchart of FIG. 18A.

FIG. 20 is a table showing measured density values in a case of zero transverse misalignment. In FIG. 20, the density values are measured in terms of V (volts), with the greater V value corresponding to the greater density.

As shown in FIG. 20, minimum density value can be measured accurately even if test pattern ink is smeared on paper.

The above measurement method needs to measure only relative, rather than absolute, densities of two or four kinds of patterns. Hence, a low cost, low resolution sensor can be used in order to determine misalignment amounts with necessary accuracy.

This preferred embodiment is explained with the assumption that the amount of misalignment between left and right printheads 4A and 4B is between −3 and 4 pixels. When the printhead misalignment is in a wider range than this, for example, between −7 and 8 pixels, then an additional step, as described below, provides the determination of the misalignment amount. The additional step perform density comparisons using "eight dots—eight spaces" test patterns.

Figure 21:
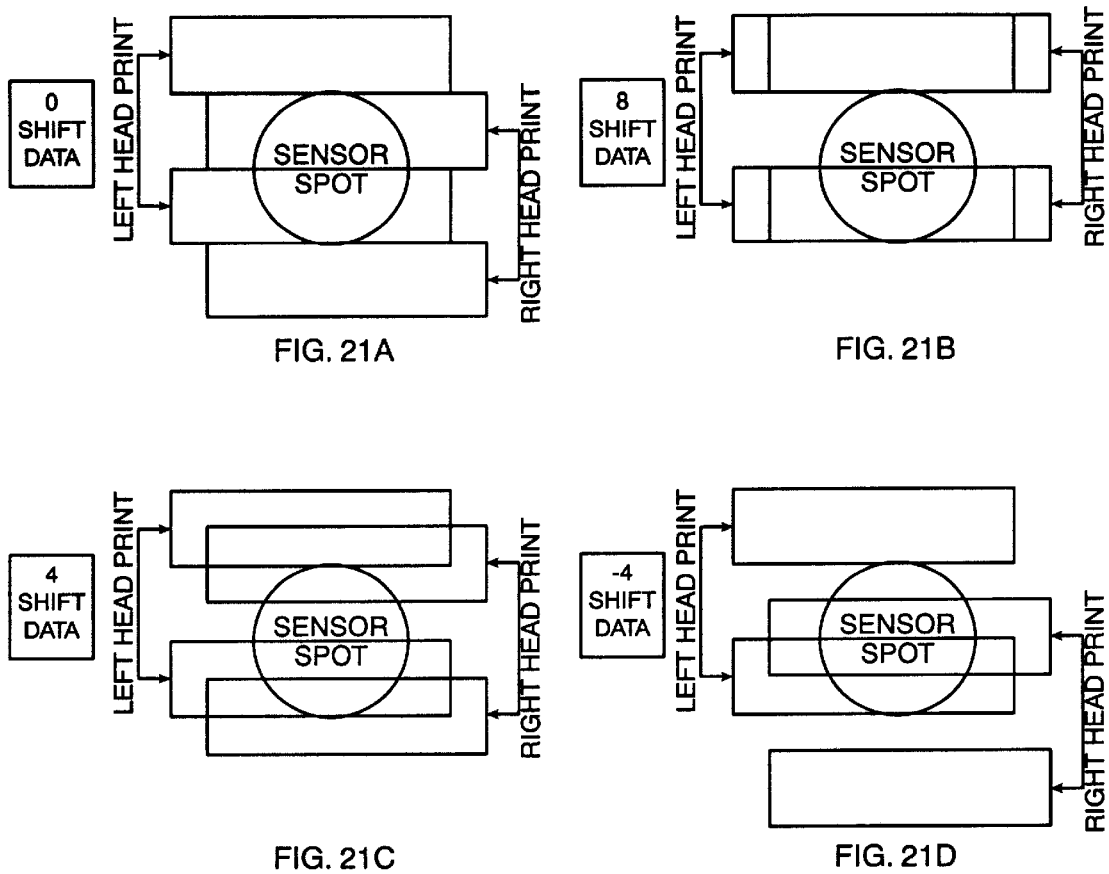
FIG. 21, comprising

When "eight dots—eight spaces" test patterns, as shown in FIG. 21, are used, a misalignment amount of printheads 4A and 4B within a 16 pixel range can be measured without using the "four dots—four spaces" test patterns. The "eight dots—eight spaces" test patterns are similar to those shown in FIG. 16. The test patterns in FIG. 21 are used when preceding density measurement results determine that the misalignment amount is 4n. Density measurements of the patterns in FIG. 21 can determine whether the misalignment amount is −4, 0, 4, or 8. If the misalignment amount is 4n+1, 4n+2 or 4n+3, the patterns in FIG. 21 are shifted by 1, 2 or 3 pixels and measured to determine the misalignment.

The amount of transverse registration misalignment is measured by the above method. Subsequent adjustment is performed by shifting original images in the transverse direction in the printing device, as in the case with FIG. 13A, based on the measured amount of misalignment. Next, lateral misalignment is determined and adjusted.

The measurement of transverse registration misalignment shown in FIG. 13A and FIG. 18A is performed by controller 104 within the printing device. Next, using FIG. 13B and FIG. 18B, an example is explained in which printer driver 103 controls measurement of transverse registration misalignment.

Figure 13B:
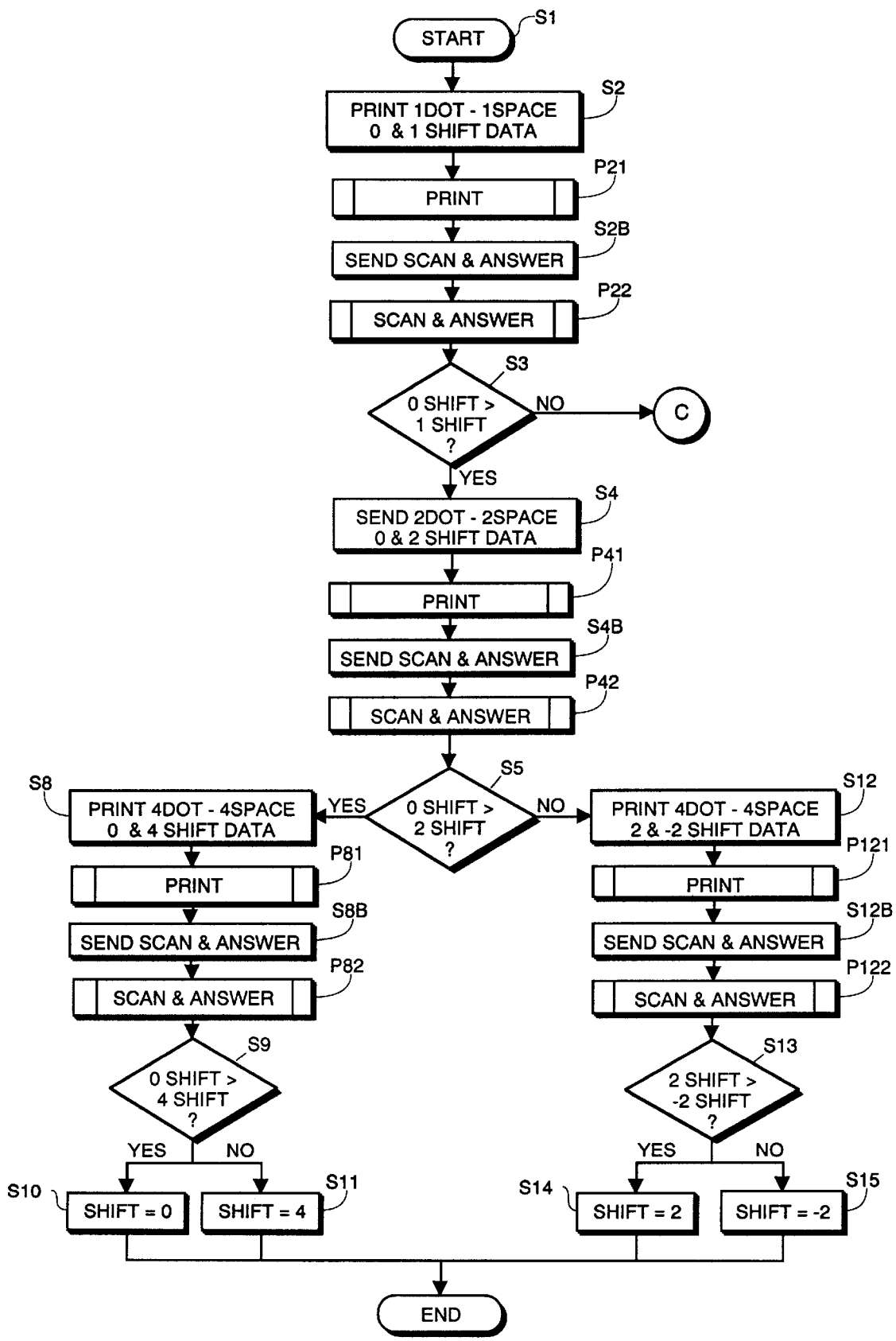
FIG. 13B is a detailed logical flowchart for measuring an amount of transverse misalignment.
Figure 13C:
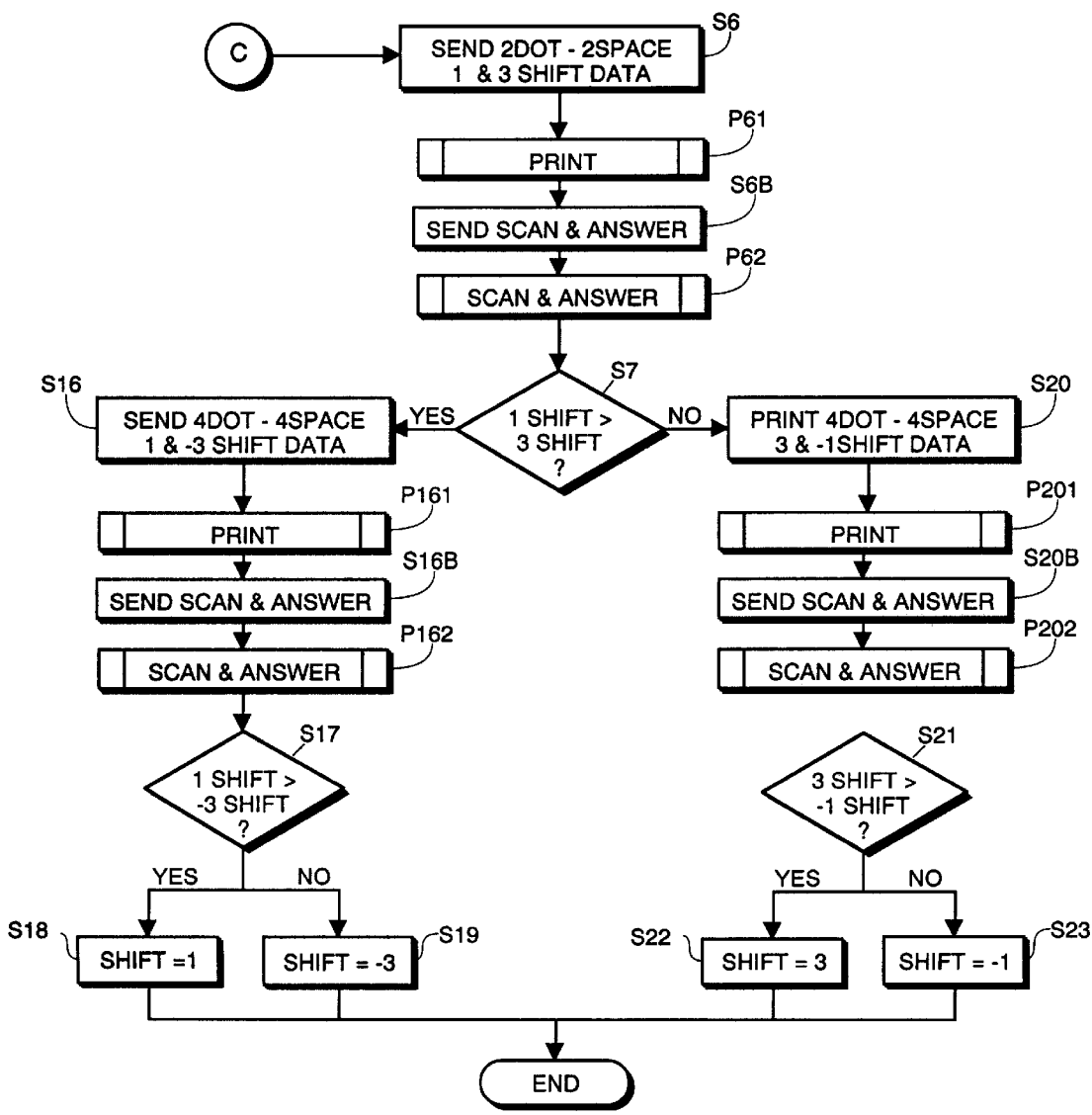
Figure 18B:
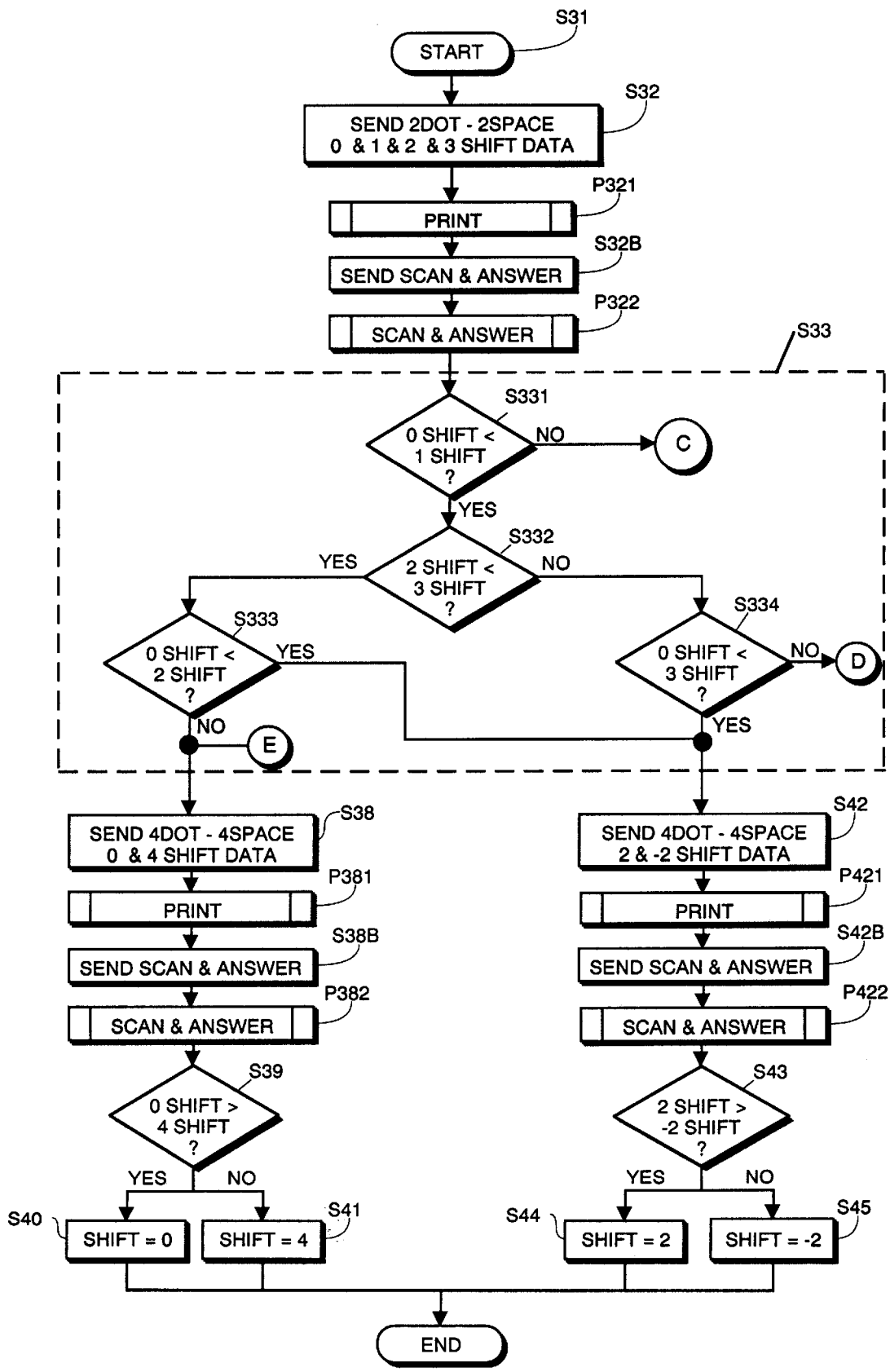
FIG. 18B is a detailed logical flowchart for measuring transverse misalignment.
Figure 18C:
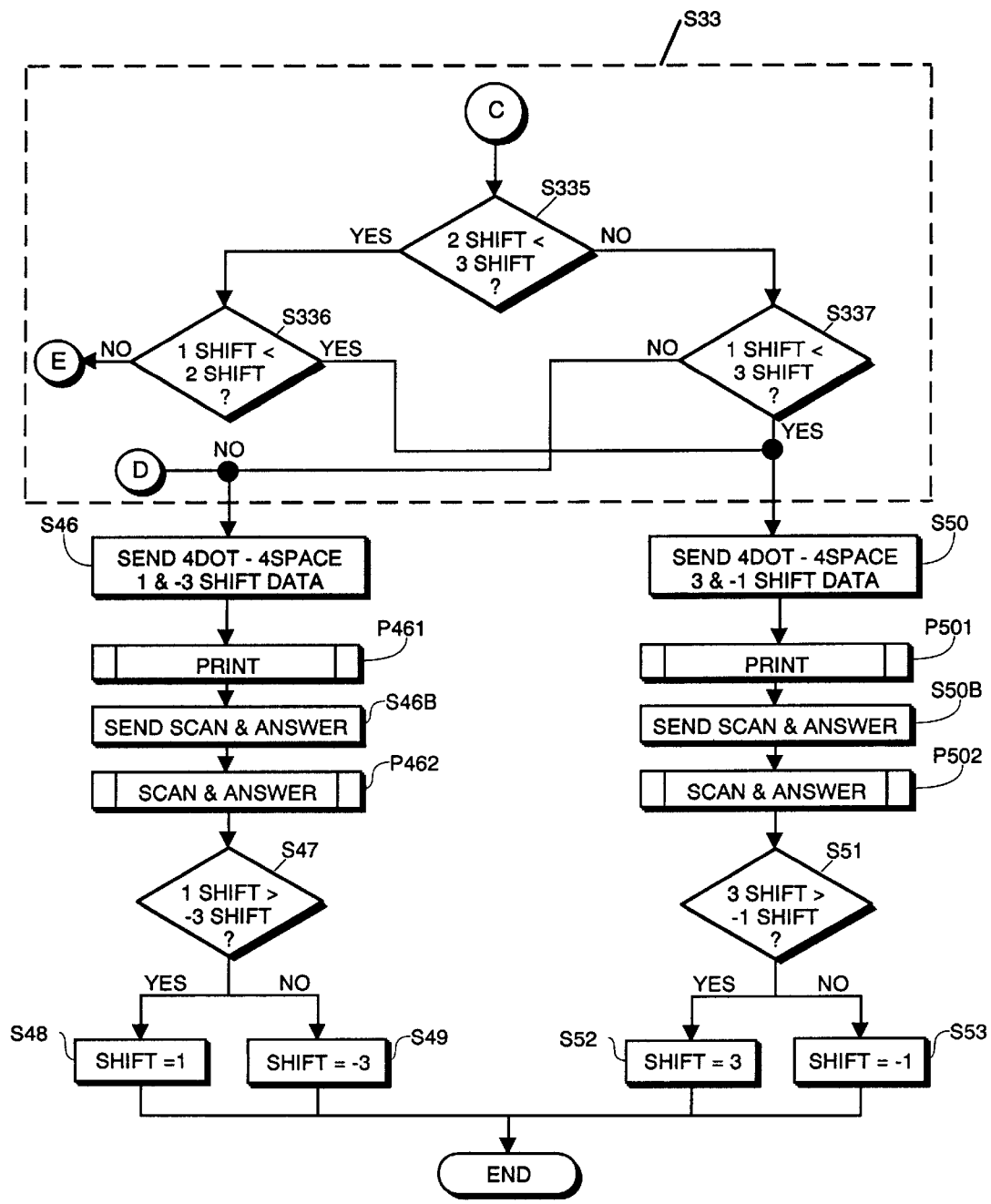

Both FIG. 13B and FIG. 18B use the same step numbering as used in FIG. 13A and FIG. 18A. In addition, steps marked "P" in FIG. 13B and FIG. 18B are performed by the printing device and steps marked "S" are performed by printer driver 103.

First, printer driver 103 transmits pattern data for the test pattern printing process to the printing device so that the printing device can print "one dot—one space" test patterns (Step S1 and S2 in FIG. 13B). The printing device then prints, in step P21, test patterns based on the transmitted test patterns. Alternatively, the printing device stores the test patterns beforehand and printer driver 103 sends commands to indicate which test patterns to use, rather that sending test pattern data.

Next, printer driver 103 sends a command to the printing device (step S2B). In response to this command, the printing device reads the printed test patterns and sends the results back to printer driver 103. The printing device reads the two printed "one dot—one space" test patterns using sensor 31 and sends the results back to printer driver 103 (step P22). As described above, the information sent by the printing device may either be measured density data or results of density comparisons. If measured density data is transmitted, the processing load in the printing device is reduced. If results of density comparisons are transmitted, the response (transmission) time is reduced.

If the results of density comparisons show that the misalignment amount is of an even number (Yes in step S3 in FIG. 13B), printer driver 103 then transmits to the printing device the "two dots—two spaces" test patterns with and without a two-pixel transverse shift, as shown in FIG. 10C and FIG. 10D (step S4 in FIG. 13B). On the other hand, printer driver 103 transmits to the printing device the "two dots—two spaces" test patterns with a one and three (or one in reverse-direction) pixel transverse shift if the results of density comparisons show that the misalignment amount is of an odd number (No in step S3 in FIG. 13B), as shown in FIG. 11C and FIG. 11D (step S6 in FIG. 13B).

Thereafter, the amount of transverse registration misalignment is determined under the control of printer driver 103 in a similar manner as described with respect to FIG. 13A.

In the method shown in FIG. 18B, printer driver 103 transmits pattern data for the test pattern printing process to the printing device so that the printing device can print four "two dots—two spaces" test patterns having a 0, 1, 2, and 3 pixel transverse shift, as shown in FIG. 16A, FIG. 16B, FIG. 16C and FIG. 16D (Step S31 and S32 in FIG. 18B). The printing device prints test patterns based on the transmitted test patterns (step P321). Instead of sending the test pattern data, the printing device may store the test patterns beforehand and printer driver 103 may send commands to indicate which test pattern to use.

Next, printer driver 103 sends a command to the printing device to read the printed test patterns and to send the results back to printer driver 103 (step S32B). The printing device then reads the two printed "two dots—two spaces" test patterns using sensor 31 and sends the results back to printer driver 104 (step P322). The information sent by the printing device may either be measured density data or results of density comparisons. If measured density data is transmitted, the processing load in the printing device is reduced. If results of density comparisons are transmitted, the response (transmission) time is reduced.

In step S33, printer driver 103 determines which of the four test patterns has the minimum density, as described with respect to FIG. 18A.

The method of step S33 in FIG. 18B determines whether the misalignment amount is 4n, 4n+1, 4n+2 or 4n+3. Based on the results, "four dots—four spaces" test patterns are chosen. These test patterns are the same as those in FIG. 12, which was explained previously. The subsequent processing steps S38 to S53 are the same as steps S8 to S23 in FIG. 13B. Thus, the densities of the two test patterns are compared and the comparison results determine the amount of misalignment.

The transverse registration misalignment is measured by the above method. The transverse registration misalignment is thereafter compensated for by transversely shifting original image data using printer driver 103. Next, lateral registration misalignment is corrected.

The amount of lateral registration misalignment between left and right printheads 4A and 4B is measured using "n dots—n spaces" test patterns as in the case with the measurement of transverse registration misalignment. However, the test pattern orientation is different by 90 degrees from that of the previously-described test patterns. Hence, the patterns used for measurement have transversely-oriented stripes, as shown in FIG. 22A to FIG. 22F. These patterns are constructed by rotating the patterns shown in FIG. 7A to FIG. 7F by 90 degrees.

The amount of lateral misalignment is measured by the printing device or by printer driver 103 based on the procedures shown in FIG. 13A, FIG. 13B, FIG. 18A and FIG. 18B. Once the amount of lateral registration misalignment is obtained, original images are shifted laterally by the printing device or by printer driver 103 based on the obtained amount. Thus, the adjustments for transverse and lateral misalignment of printheads 4A and 4B are completed.

In this preferred embodiment, an adjustment of lateral registration misalignment is performed after an adjustment of transverse registration misalignment is completed. Because density of the test patterns used for determining lateral misalignment is constant in the transverse direction, the pattern length can be negligible in the transverse direction. On the contrary, if the adjustment for the transverse registration misalignment is performed after the adjustment for the lateral registration misalignment, the lateral range over which test patterns for the transverse misalignment determination are printed can be small.

Moreover, if the adjustments for both transverse and lateral registration misalignments are performed in parallel, test patterns can be printed at the same time and the sensor can read the patterns at the same time. Hence, a time period required for misalignment adjustments can be halved.

(The second preferred embodiment)

This preferred embodiment employs bi-directional (reciprocal) printing during bi-directional serial scanning, and thereby increases the speed of printing.

In bi-directional printing, pixels printed during printhead movement in one direction are often incorrectly aligned with pixels printed during movement in the opposite direction. Reasons for this misalignment include a time lag between drive signals, actual movement due to the carriage weight, and backlash which occurs in gears or belts.

In this preferred embodiment, the printing device or printer driver 103 measures the misalignment of printing locations of each direction of the reciprocal movements. Original images are then shifted by the printing device or printer driver 103 based on the measured amount of misalignment.

The structural design of this preferred embodiment is the same as that of the first preferred embodiment. Specifically, printheads 4A and 4B divide the printing area and perform the printing function.

The preferred method to measure the amount of lateral misalignment due to the reciprocal movements is the same as the previously-explained method to measure the amount of lateral registration misalignment. In other words, the test patterns in FIG. 22A to FIG. 22F are used, and the printing device or printer driver measures the amount of misalignment by following the flowchart of FIG. 13A or FIG. 13B.

However, in contrast to the method to measure the amount of lateral registration misalignment, the test patterns are printed by left printhead 4A only, and an n-pixel shift is incorporated between one direction and the other of the reciprocal movements of printhead 4A, which prints bi-directionally.

Only left printhead 4A is used to measure the amount of lateral misalignment because the lateral misalignment of pixels printed in each of the two printing directions due to printheads 4A and 4B is assumed to be zero. Therefore, for the purpose of the foregoing explanation, the lateral alignment is affected only by interactions between the carriage and the printing device during the reciprocal movements. However, the amount of registration misalignment due to the reciprocal movements can be measured for both printheads in order to determine the misalignment with greater precision.

This preferred embodiment measures the transverse misalignment of printing locations between both directions of the reciprocal movements, in addition to the lateral misalignment of printing locations. Transverse registration misalignment of the reciprocal movements of the printhead is explained below with reference to FIG. 23A to FIG. 23C.

In FIG. 23A, carriage 1, which is stationary against guide axis 2, and printheads 4A and 4B are transversely aligned. In FIG. 23B, carriage 1 is moving in one direction of the reciprocal movements. Carriage 1 is twisted around point z1 because of space within carriage 1 surrounding guide axis 2. The twist creates transverse registration misalignment "a" between printheads 4A and 4B. In FIG. 23C, carriage 1 is moving in the opposite direction than shown in FIG. 23B. Carriage 1 is twisted around point z2 because of space within carriage 1 surrounding guide axis 2. The twist creates transverse registration misalignment "b" between printheads 4A and 4B. As a result, the transverse registration misalignment due to the reciprocal movements is "a+b".

In this preferred embodiment, the transverse misalignments of printing locations during movement in each direction of the reciprocal scanning movements are determined. The areas in which the printheads are used are adjusted in order to compensate for the transverse registration misalignment due to the reciprocal movements.

The method to measure the transverse registration misalignment during the movement in one direction is the same as the previously-explained method to measure the transverse registration misalignment between two printheads. Only left printhead 4A is used to print the test patterns because, as explained with respect to FIG. 23, carriage 1, printhead 4A and printhead 4B are assumed to be properly aligned with each other. The test patterns printed during the movement of the printhead in one direction are shifted by n pixels from those during the movement in the other direction.

For higher accuracy measurements, the transverse registration misalignment can be measured for each printhead. Thereafter, each printhead can be adjusted independently or the average value of the misalignment can be used to adjust both printheads 4A and 4B.

(The third preferred embodiment)

When multiple printheads are used for printing, differences among the printheads, such as differences in the amount of ink ejection, cause differences in printing density among the multiple printheads. Such density differences among printheads adversely affects the quality of a printed image. Hence, in this preferred embodiment, the density of image data printed by each printhead is adjusted based on individual density characteristics of each printhead. Corrections to image density can be achieved not only by the output correction of original images, but also by other methods such as temperature control of the printheads in a printer, or control of drive signals.

As is the case with previous embodiments, this preferred embodiment utilizes a low resolution sensor to obtain information relating to relative densities of test patterns. The structure of this preferred embodiment is the same as that of the first preferred embodiment which was explained previously. In other words, printheads 4A and 4B divide the printing area into two and perform the printing function.

Initially, printhead 4A prints a striped test pattern having a density which gradually decreases from the left side of the pattern to the right. Right printhead 4B prints a striped test pattern having a density which gradually increases from the left side of the pattern to the right. As shown in FIG. 24A, the stripes drawn by one printhead alternate with the stripes drawn by the other in the overlapped printing area.

FIG. 24B is a graph showing the density distribution of the printed alternating test pattern. As shown in the Figure, the density alternates between "high" and "low" when traversing the graph from one end toward the center, at which point the alternation switches from "low" to "high".

The densities output by each printhead are nearly equal at the region where alternation switches. Accordingly, the relative output density between the left and right printheads can be obtained from the intended densities of both printheads in this region.

For example, when a test pattern with alternating printing densities (printing duty) of 100% and 0% is printed by both printheads, the relative density distribution for both printheads shown in FIG. 24C is obtained. The ratio, a:b, obtained at the location where, as described above, the "high" and "low" order reverses, is equal to the ratio of the highest density printed by left printhead 4A to the highest density printed by right printhead 4B.

Using this density ratio, printer driver 103 corrects the multiple-level signals of original images sent to the printhead having a higher density (in this example, 4A). In this preferred embodiment, the printhead with a higher density is adjusted to match the density of the printhead having a lower density. Alternatively, a correction method to adjust a printhead having a lower density to match the density of the other printhead, having a higher density, can be also used.

A method for obtaining the density ratio described above is set forth in the flowchart of FIG. 25. The logic in this flowchart is executed under the control of the controller software 104 in the printing device.

Figure 25:
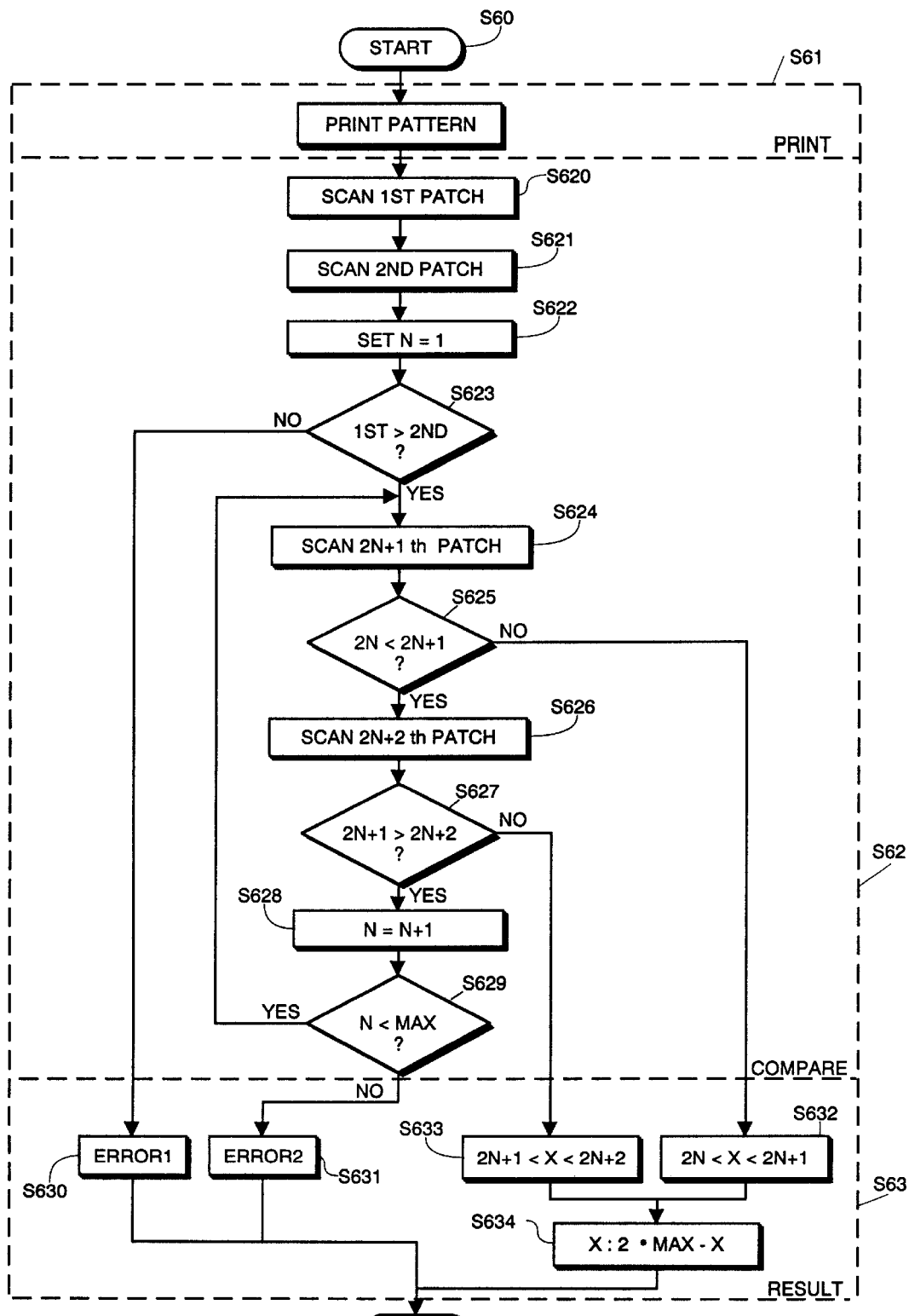
FIG. 25 is a logical flowchart to measure printhead output density ratio.

In FIG. 25, steps S60 to S64 can be primarily divided into a printing step (step S61), a comparison step (step S62), and an acquisition step (step S63). In the printing step, a test pattern is printed by both printheads 4A and 4B, which are the objects of the density measurements. The test pattern contains multiple stripes printed so as to maintain a continuously changing output density ratio between both printheads. In the comparison step, the densities of adjacent stripes of the printed test pattern, for which the density ratio continuously changes as the pattern is traversed, are compared. In the acquisition step, the relative output densities of printheads 4A and 4B are determined based on the results of the comparison step.

The comparison step S62 comprises substeps S620 to S629. The comparison step contains an algorithm which locates change point X by scanning the test pattern from left to right. At change point X, the density of a odd-numbered stripe is lower than that of the preceding even-numbered stripe, or the density of a even-numbered stripe is higher than that of the preceding odd-numbered stripe.

First, in steps S620 to S622, a variable N is initialized and the first and second stripes of the test pattern are measured. If the density of the second stripe is higher than that of the first stripe (No in step S623), the lowest density of printhead 4B is greater than the highest density of the printhead 4A. Hence, the program proceeds to step S630 to conduct an error process. Otherwise, the density of an odd-numbered stripe is measured in step S624. Step S625 determines whether the density of the odd-numbered stripe is higher than that of the preceding even-numbered stripe. If the response is positive, then, in step S626, the density of the next even-numbered stripe is measured. Step S627 determines whether the density of the next even-numbered stripe is greater than that of the preceding odd-numbered stripe. If not, the variable N is incremented in step S628.

Steps S624 to S628 are repeated until, in step S629, the variable N exceeds the maximum number of stripes. If N exceeds the maximum number in step S629, the program proceeds to step S631 to conduct an error process, because the lowest output density of printhead 4A is greater than the highest density of printhead 4B.

If the result of step S625 is No, the density of the compared odd-numbered stripe (2N+1) is lower than that of the preceding even-numbered stripe (2N). Accordingly, flow proceeds to step S632, in which change point X is determined to be within the range 2N to 2N+1.

Similarly, if the result of step S627 is No, the density of the compared even-numbered stripe (2N+2) is greater than that of the preceding odd-numbered stripe (2N+1). Accordingly, the program proceeds to step S633, in which change point X is determined to be within the range 2N+1<X<2N+2.

This preferred embodiment approximates that change point X lies at the center of the determined range. Alternatively, the position of change point X may be roughly estimated based on the density ratio between the two stripes defining the boundaries of the range. In step S634, the density ratio of printheads 4A and 4B is obtained based on the obtained change point X and the maximum number of stripes.

The density ratio of printheads 4A and 4B, which is obtained in the printer, is transmitted to printer driver 103. Based on this density ratio, printer driver 103 makes corrections to the multiple-level signals of original images.

In this preferred embodiment, the density ratio is obtained under the control of the controller software in the printer. The ratio may alternatively be obtained under the control of printer driver 103, along the lines of FIG. 13B and FIG. 18B.

A first variation of this preferred embodiment is explained below using FIG. 26A to FIG. 26C. In this variation, left printhead 4A prints a test pattern using an image in which the density gradually becomes lower from the left side of the image to the right, while right printhead 4B prints a test pattern having a constant density. As shown in FIG. 26A, the stripes drawn by one printhead alternate with the stripes drawn by the other printhead within the overlapped printing area.

FIG. 26B shows the density distribution of the printed alternating test pattern. As in FIG. 24B, the sequence of "high" and "low" density stripes reverses near the center of the graph. Moreover, the densities of both printheads are nearly equal at the point at which the sequence reverses. The relative density ratio between left and right printheads 4A and 4B can be obtained from the ratio of the printed densities in the region surrounding the point.

For example, in a case where a test pattern having printing densities (printing duty) decreasing from 100% to 0% is printed by left printhead 4A and another pattern having a 50% density is printed by right printhead 4B, the relative density relationship shown in FIG. 26C is obtained. At the above-described point of sequence reversal, the ratio of distance a+b to distance b is equal to the ration of the maximum density of left printhead 4A to the half (50% of maximum) density of right printhead 4B. Based on this relationship, corrections are made to the multiple-level signals of original images sent to the printhead having greater maximum output density (4A in this example).

Contrary to the foregoing examples, output density often varies non-linearly with the ejection amount (printing density). Therefore, the below-described second variation of this preferred embodiment measures the density relationship between two printheads over two different output density ranges.

Figure 27:
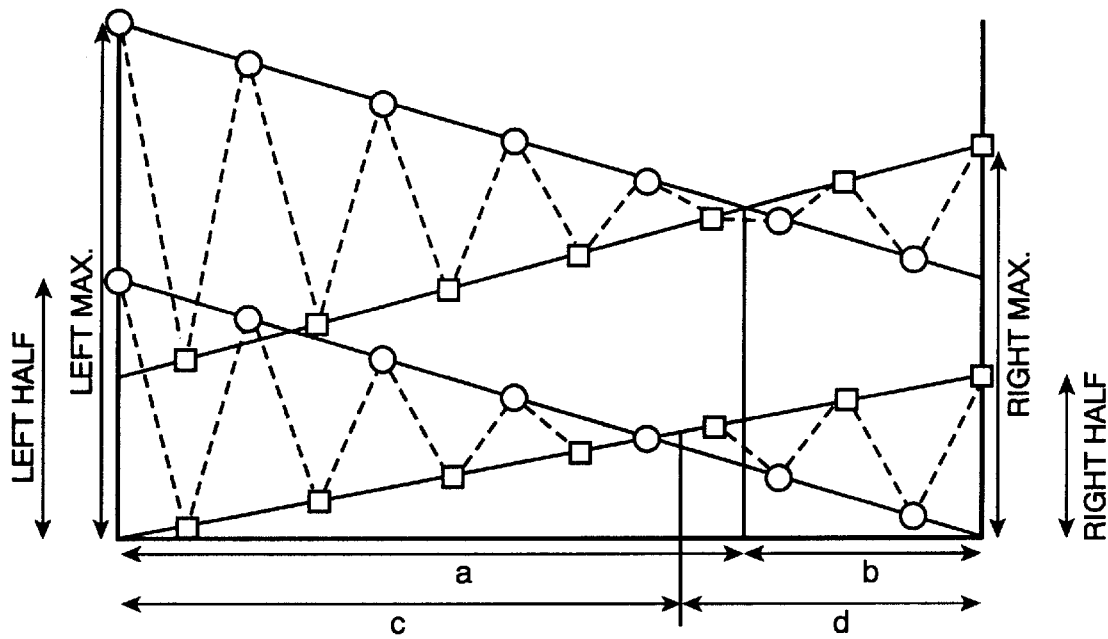
FIG. 27 is a graph of output densities for two density ranges of two printheads.

For example, printhead 4A prints an alternating striped test pattern in which the printing density varies from 100% to 50% and printhead 4B prints alternating stripes in which the printing density varies from 50% to 100%. Similarly, printhead 4A prints a second pattern of alternating stripes in which the printing density varies from 50% to 0% and printhead 4B prints alternating stripes on which print density varies from 0% to 50%. The resulting output density relationships of each pattern are shown in FIG. 27.

Ratios a:b and c:d, defined at the change points for each of the two test patterns, each represent the ratio of the maximum density of printhead 4A to the half (50% of maximum) density of printhead 4B. Based on these ratios, corrections are made to the multiple-level signals of original images for the higher density printhead (4A in this example). In detail, corrections for images requiring printing densities of 0% to 50% are made based on the c:d ratio, and corrections for images having printing density of 50% to 100% are made based on the weighted average of the a:b and c:d ratios.

In this variation, accurate corrections for printheads 4A and 4B are possible even where the density relationship between printheads 4A and 4B varies non-linearly.

In a further variation, an alternating striped test pattern having a printing duty decreasing from 100% to 50% is printed using printhead 4A. As in the first variation example, printhead 4B prints an interweaving striped pattern having a constant density (for example, 75%). The output density distribution for such a test pattern is illustrated in FIG. 28A.

In this example, the actual output density of left printhead 4A is 20% higher than the assigned printing duty (slanted broken line) and that of right printhead 4B is 20% lower (thin horizontal line). Accordingly, at the right end of the test patterns, the density of left printhead 4A is 20% higher than 50%, or 60%, and that of the right printhead is 20% less than 75%, or 60%. Hence, the lines representing the density distributions do not intersect.

Alternatively, in a case where the actual output density of left printhead 4A is 20% lower than the assigned printing duty (thin slanted line) and that of right printhead 4B is 20% higher (broken horizontal line), the left end of the test patterns contains 80% density due to left printhead 4A and 90% density due to right printhead 4B. Therefore, in this case as well, the lines representing the density distributions do not intersect.

However, as shown in FIG. 28B, the density distributions of the test patterns will intersect even under the above-described circumstances if the printing duty of test data printed by printhead 4A is set to vary from 50% to 100% and the printing duty of test data printed by printhead 4B is set to vary from 100% to 50%. Accordingly, the density ratio between printheads 4A and 4B can be determined.

It should be noted that it is more desirable to print test patterns beginning with stripes having a lower printing density and increasing to stripes having a higher printing density. Such a method reduces the degree of printhead temperature increases due to test pattern printing. In addition, in the above explanation, printheads 4A and 4B alternate in printing the test patterns. However, although density comparison should be performed between alternating stripes, the order in which the stripes are printed is not fundamentally important.

(The fourth preferred embodiment)

This preferred embodiment employs bi-directional printing, in which printing is performed in both (reciprocal) directions of the serial scanning movements of carriage 1 in order to increase the print speed.

In bi-directional printing, density differences appear between bands (swaths) printed in one direction and those printed in the other direction due to differences in printing characteristics. The differences arise because, in an ink jet printing device, ink jets include satellite ink droplets in addition to main ink droplets. The locations at which the satellite droplets land on a print medium with respect to the main droplets differ in accordance with scanning direction. Hence, the area covered by ink differs according to scanning direction.

This preferred embodiment measures the density characteristics (density ratio) during scanning in both directions and corrects multiple-level original image data based on these measured characteristics.

The design of this preferred embodiment is the same as that of the first preferred embodiment. Printheads 4A and 4B divide the printing area into two sections in order to perform the printing function.

Measurement of the density characteristics during scanning in either direction is similar to the measurement method outlined for printheads 4A and 4B in the third preferred embodiment. In other words, the test pattern shown in FIG. 24A is printed during scanning in both directions and density ratios are calculated by following the flowchart in FIG. 25.

In this preferred embodiment, the entire test pattern is printed in each of the divided printing areas, once using printhead 4A and once using 4B. Therefore, the relative density characteristics of each printhead during scanning n both directions are measured.

Figure 29:
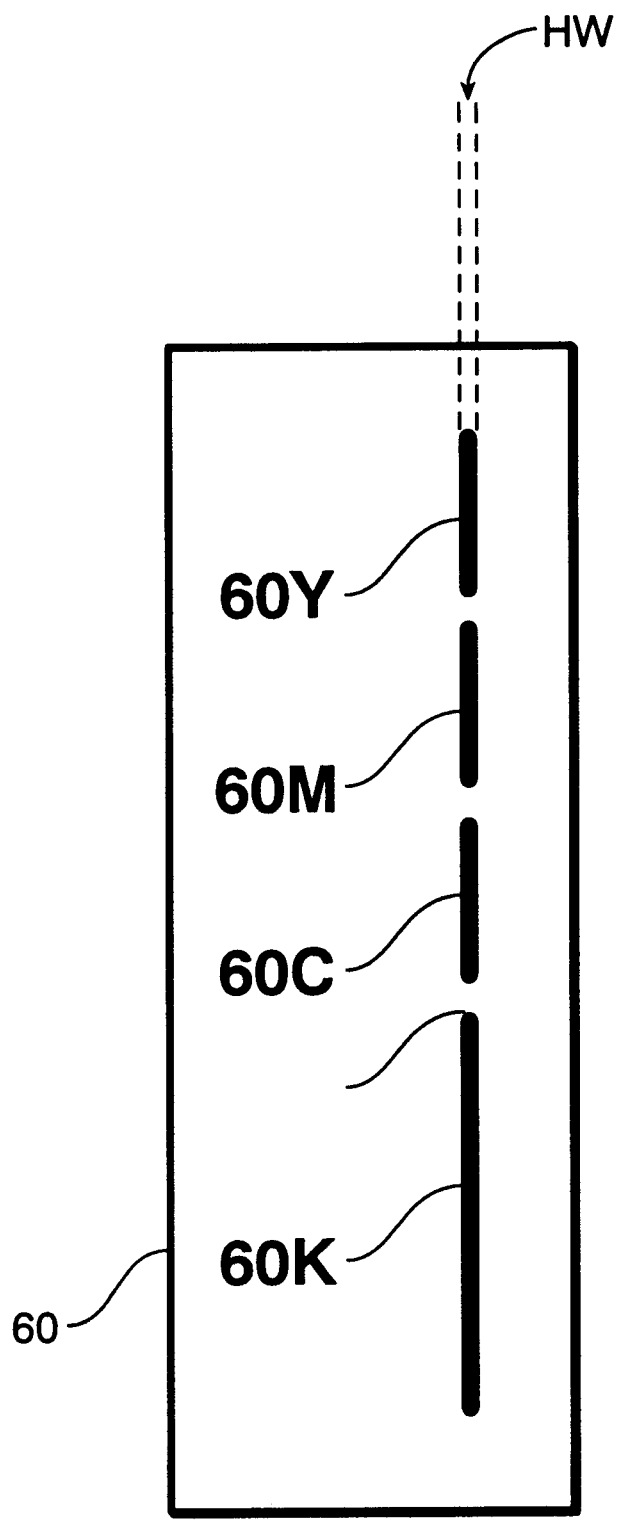
FIG. 29 is a representative view of a printhead having vertically-aligned ink jet nozzles formed into one unit.

The printheads of each above example have ink jet nozzles for Black (Bk), Cyan (C), Magenta (M), and Yellow (Y) formed as one unit, as shown in FIG. 29. Here, 60K denotes Bk ink jet nozzles, 60C indicates C ink jet nozzles, 60M indicates M ink jet nozzles, and 60Y denotes Y ink jet nozzles. The printhead width is denoted as HW in FIG. 29.

Figure 30:
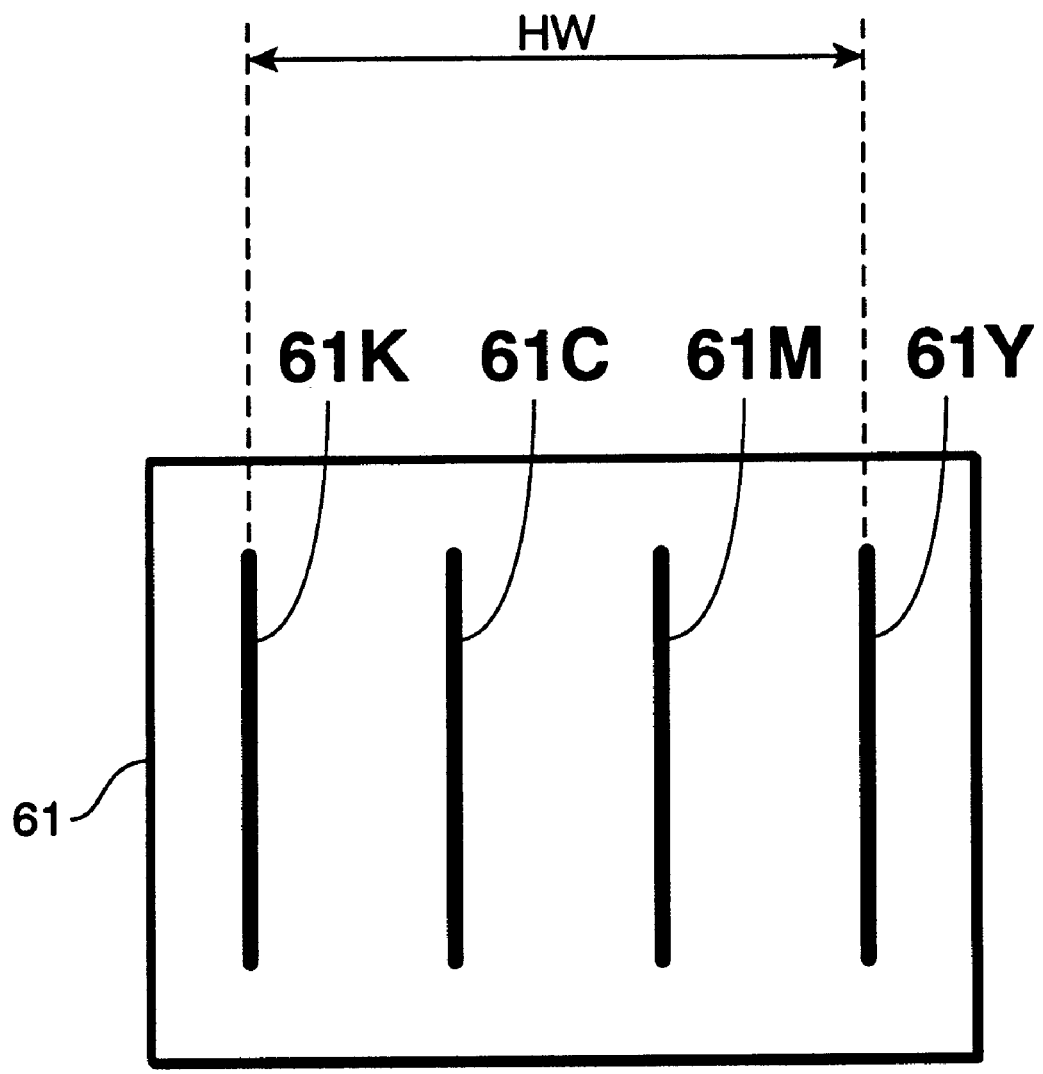
FIG. 30 is a representative view of a printhead having ink jet nozzles arranged in a parallel formation.

Printheads can also be arranged as shown in FIG. 30, wherein ink jet nozzles for Bk, C, M, and Y lie parallel within one unit. Here, 61K indicates Bk ink jet nozzles, 61C indicates C ink jet nozzles, 61M indicates M ink jet nozzles, and 61Y indicates Y ink jet nozzles. Alternatively, the nozzles of FIG. 30 may be formed in separate adjacent units. In either case, HW denotes the printhead width.

When using printheads as shown in FIG. 30, carriage 1 must scan a greater area, HW, than the printheads of FIG. 29 in order to print within areas of identical width.

(The fifth preferred embodiment)

Figure 31:
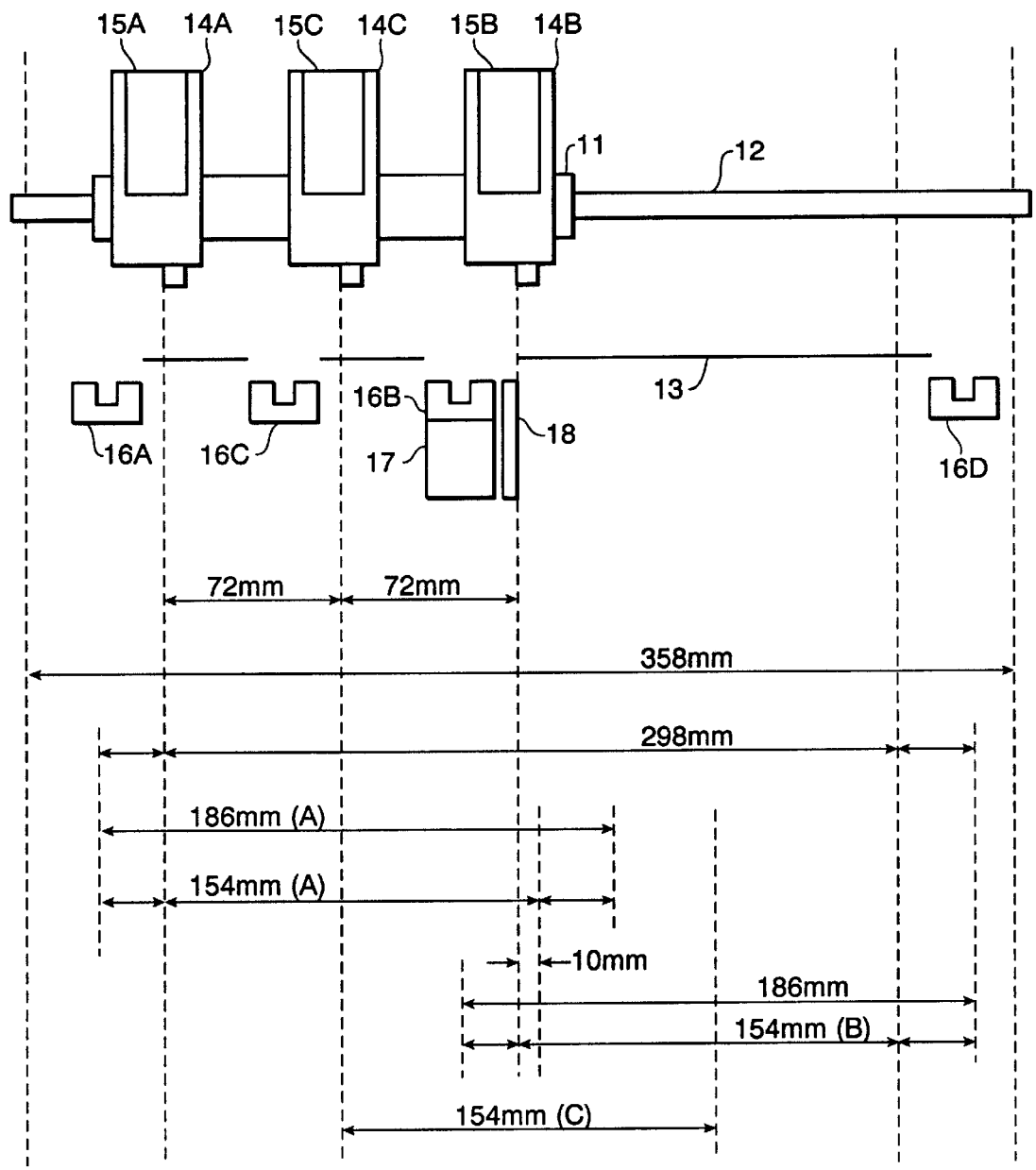
FIG. 31 illustrates regions of divided printing and overlapped printing in a case where three printheads are used in a printing device.

FIG. 31 is a representative view of a printing device according to the fifth preferred embodiment of the invention. The Figure also shows the physical relation of various printing sections such as divided printing areas.

This preferred embodiment is designed for a print medium having a maximum size of A3. Hence, the maximum paper width is 312 mm. Accordingly, printheads used in this embodiment must provide scanning over a 298 mm-wide area. The actual maximum printable area is obtained by subtracting ramp up and ramp down areas (16 mm each) from this scanning area. The ramp up and ramp down areas are used to accelerate and decelerate printheads 14A, 14B, and 14C.

Generally, a printing device according to this preferred embodiment is designed in consideration of the required maximum printable area as well as device size minimization. For example, in order to minimize the size of the device and maintain a satisfactory maximum printable area, the area over which carriage 11 scans is defined to be 358 mm wide.

In FIG. 31, ink jet printing printheads 14A, 14B and 14C are mounted on carriage 11 with a fixed separation of 72 mm between each printhead. Tanks 15A, 15B and 15C are installed on printheads 14A, 14B, and 14C, respectively. Tanks 15A, 15B, and 15C store ink which is supplied to the printheads. As explained later, high-density ink for all colors is stored in tanks 15A and 15B, and low-density ink in tank 15C. Therefore, tanks 15A and 15B eject high-density ink and tank 15C ejects low-density ink. Any of tanks 15A, 15B, and 15C and printheads 14A, 14B, and 14C can be removed from carriage 11 independently from the others. Alternatively, a tank and a printhead may form one unit and this unit may be installed onto and removed from carriage 11.

Carriage 11 is configured so as to allow it to be positioned anywhere within the scannable space (358 mm) shown in FIG. 31 and to allow ink jet nozzles of printheads 14A, 14B and 14C to be located anywhere within a respective 186 mm scanning area. Although printhead 14A scans within scanning area 186 mm (A), printhead 14A prints over a smaller area (154 mm (A)) due to ramp up and ramp down areas in which carriage 11 accelerates and decelerates. Similarly, printhead 14B scans within its printing area (154 mm (B)), and printhead 14C scans within its printing area (154 mm (C)).

Caps 16B and 16C are provided for the ink jet nozzles of printheads 14B and 14C, respectively, under a platen 13 within the scannable space of carriage 11. Cap 16A, used for printhead 14A, is provided at the edge of the device, away from platen 13. When located at a home position, caps 16A, 16B, and 16C each cap their corresponding printhead.

Pump 17 is connected to cap 16B and is therefore located in the overlapped printing area of printheads 14A, 14B, and 14C. Pump 17 sucks away ink from a printhead through cap 16B. At a certain time, each of printheads 14A, 14B and 14C travel to a position facing cap 16B. Accordingly, pump 17 can perform a pumping operation on each of printheads 14A, 14B, and 14C.

As explained above, the present design allows a size of a printing device to be minimized for a given maximum printable area. Accordingly, a device to recover the suction of pump 17 is located within the printing area and share the hardware for other functions. Similarly, dummy ejection receptors are located at opposing ends of the scannable space and away from platen 13.

In the printing device of this preferred embodiment, the printhead separation (72 mm), or the distance between the ink jet nozzle groups of each printhead 14A, 14B and 14C, is defined to be approximately one-fourth of the maximum printable area (298 mm). Printheads 14A, 14B, and 14C share the maximum printable area by printing over divided and overlapping printing areas 154 mm in width. Each of the above sizes is defined so that the maximum printable area corresponds to the width of A3 paper (a standard size of 297 mm×420 mm), which is relatively large. In addition, the overlapped printing area corresponds to the width of A5 paper (a standard size of 148 mm×210 mm).

The maximum printable area is approximately twice as wide as the overlapped printing areas. Therefore, in a case where the FIG. 31 device prints on a paper having the size of the maximum printable area, for example, A3 paper, printheads 14A and 14B eject a same type of ink and print over their respective assigned portion of the divided printing areas. When the device prints on a paper having a width corresponding to the size of the overlapped printing area, for example, A5 paper, printhead 14C ejects ink having a different concentration than ink of printheads 14A and 14B. Both concentrations of ink are can be therefore be combined to create dark and light (gray scale) printing.

The printing device of this preferred embodiment, as shown in FIG. 31, therefore provides printheads 14A and 14B, which generally share the maximum scanning area and thereby increase print speed for A3-sized printing in comparison to a printing device having one printhead. Furthermore, the foregoing arrangement allows a maximum printable area to be as large as possible within the scannable area of carriage 11 while maintaining a small printing device size.

The "high-density" inks ejected from printheads 14A and 14B as described above are of a normal concentration. Accordingly, these printheads can perform binary printing on paper of A3 and other sizes in the area (10 mm) common to the divided printing areas. Various methods are considered as to how to print in this area at which the two divided printing areas overlap. This preferred embodiment uses the same method as that used in the previous preferred embodiments.

With respect to printing in an overlapped printing area on paper of A5 and other sizes, many levels of gray scale printing can be performed using the high-density inks of printheads 14A and 14B in conjunction with the low-density inks of printhead 14C. As is obvious in FIG. 31, this overlapped printing area (154 mm (C)) is divided at its center. The left side of the area is accessible via printheads 14A and 14C, and the right side via printheads 14B and 14C. During printing operation in this overlapped printing area, when carriage 11 scans from left to right of the Figure, for example, printhead 14C prints first on the left half of the overlapped printing area, followed by printhead 14A. In addition, printhead 14B prints first on the right side of the overlapped area, followed by printhead 14C. Printing output in said central area may therefore have uneven output because, in one half of the area, low-density ink is applied first and, in the other half, high-density ink is applied first.

In this preferred embodiment, the visual effects of the above problem can be reduced by performing bi-directional printing. Another method of addressing this problem is to print using the high-density ink of printheads 14A and 14B during some scanning movements and to print only with the low-density ink from printhead 14C during other scanning movements. In this case, the sequence in which high-density and low-density ink is ejected upon one point of a printed surface is the same for the left and right sides of the overlapped area.

Another method of addressing this problem is to move a print medium in one direction during printing using printheads 14A and 14B and in another direction during printing using printhead 14C. As a result, and as above, printing of different inks is performed during different scanning movements.

In a printing device according to this preferred embodiment, transverse registration misalignments can be adjusted in the same way as described with respect to the first preferred embodiment. In order to minimize transverse registration misalignments among the three printheads, it is desirable to measure and adjust transverse registration misalignment between printheads 14A and 14B, between printheads 14A and 14C, and between printheads 14B and 14C. It should be noted that, in order to measure transverse registration misalignment between printheads 14A and 14B, test patterns must be printed in the overlapped printing area common to printheads 14A and 14B (10 mm).

Similarly, lateral registration misalignments can be adjusted as described with respect to the first preferred embodiment. Again, test patterns must be printed in the overlapped printing area common to printheads 14A and 14B (10 mm) in order to measure the lateral registration misalignment between printheads 14A and 14B.

The registration misalignments resulting from the reciprocal movements of this embodiment can be corrected using the method of the second preferred embodiment, as measurement of registration misalignment due to reciprocal movements for one of printheads 14A, 14B, and 14C enable adjustment for such misalignment.

Output density relationships among printheads 14A, 14B and 14C can be measured and adjusted using the method of the third preferred embodiment. Similarly, output density relationships between output printed in each direction of the reciprocal movements for each of printheads 14A, 14B and 14C can be measured and adjusted using the method of the fourth preferred embodiment.

(The sixth preferred embodiment)

This preferred embodiment provides for correction of a misaligned image printed using printheads mounted at an incorrect angle on a carriage or using a row of multiple printing elements (nozzles) misaligned with respect to a printhead. The device of this preferred embodiment is the same as that shown in FIG. 2. Furthermore, although printhead 4A is discussed below, the method of this embodiment may also be applied to printhead 4B.

Figure 32:
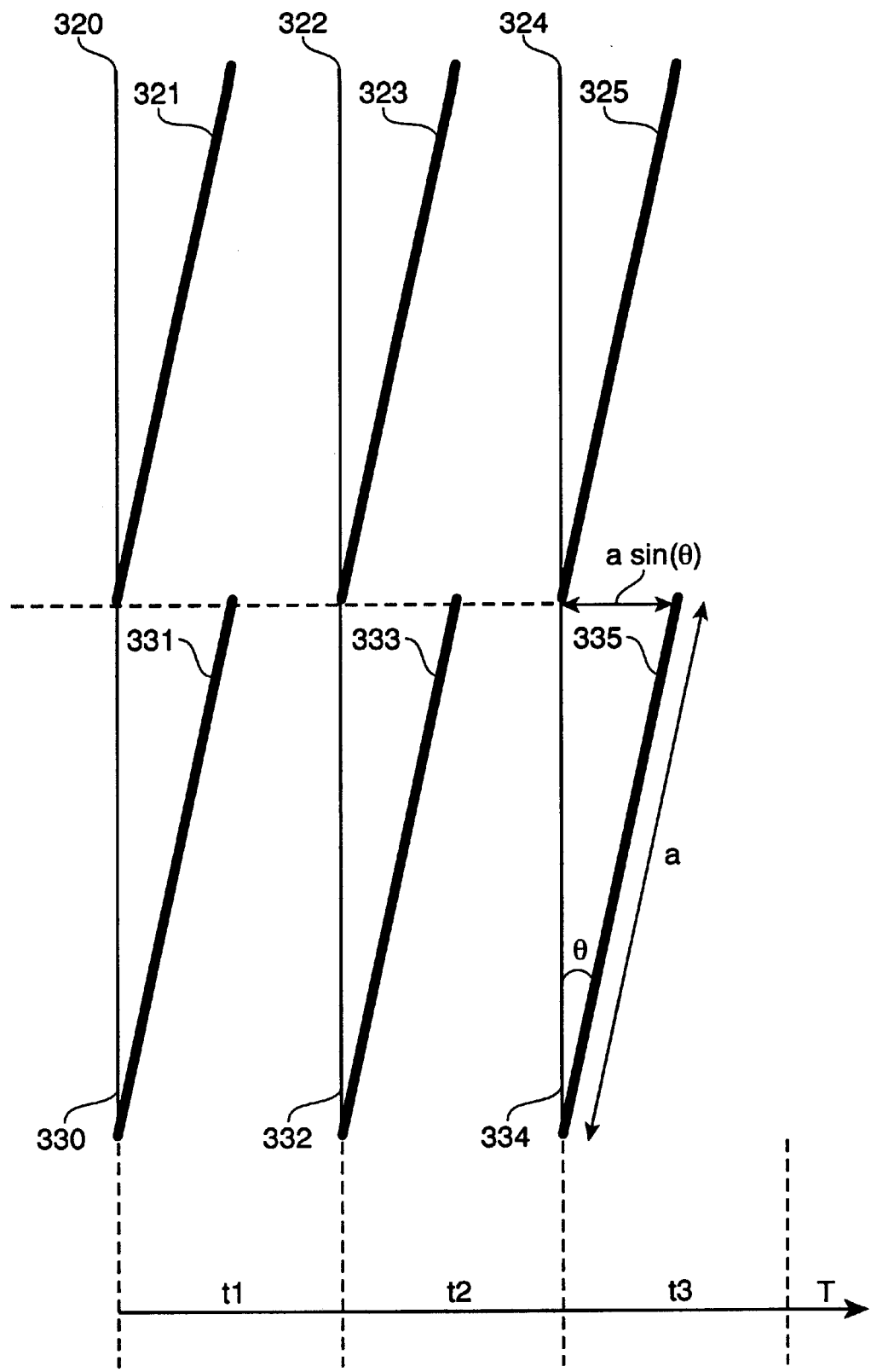
FIG. 32 illustrates vertical lines as printed by a tilted or misaligned printhead.

FIG. 32 illustrates vertical lines printed by printhead 4A using multiple printing elements (nozzles) 40. The lines are printed at an interval of every other dot. Angle Θ is defined by the scanning direction of printhead 4A and the direction in which nozzles 40 are disposed.

As shown in the Figure, numerals 320, 322 and 324 represent ideal vertical lines printed at the one-dot interval during a first scan, and numerals 321, 323 and 325 represent the actual vertical lines printed by printhead 4A during the first scan. Similarly, numerals 330, 332 and 334 represent ideal vertical lines at the one-dot interval during a second scan, and numerals 331, 333 and 335 represent the actual vertical lines printed by the printhead 4A during the second scan. Vertical lines 321 and 331 are printed at timing t1, and lines 323 and 333 are printed at timing t2. The printing period is represented by T.

As can be understood by reference to the Figure, the vertical lines drawn by head 4A have a deviation of a*sin (Θ). In this example, the deviation corresponds to two pixels. When the head length defined by "a" is long, the deviation becomes large even for a small head misalignment angle Θ and image quality is adversely affected.

Figure 33:
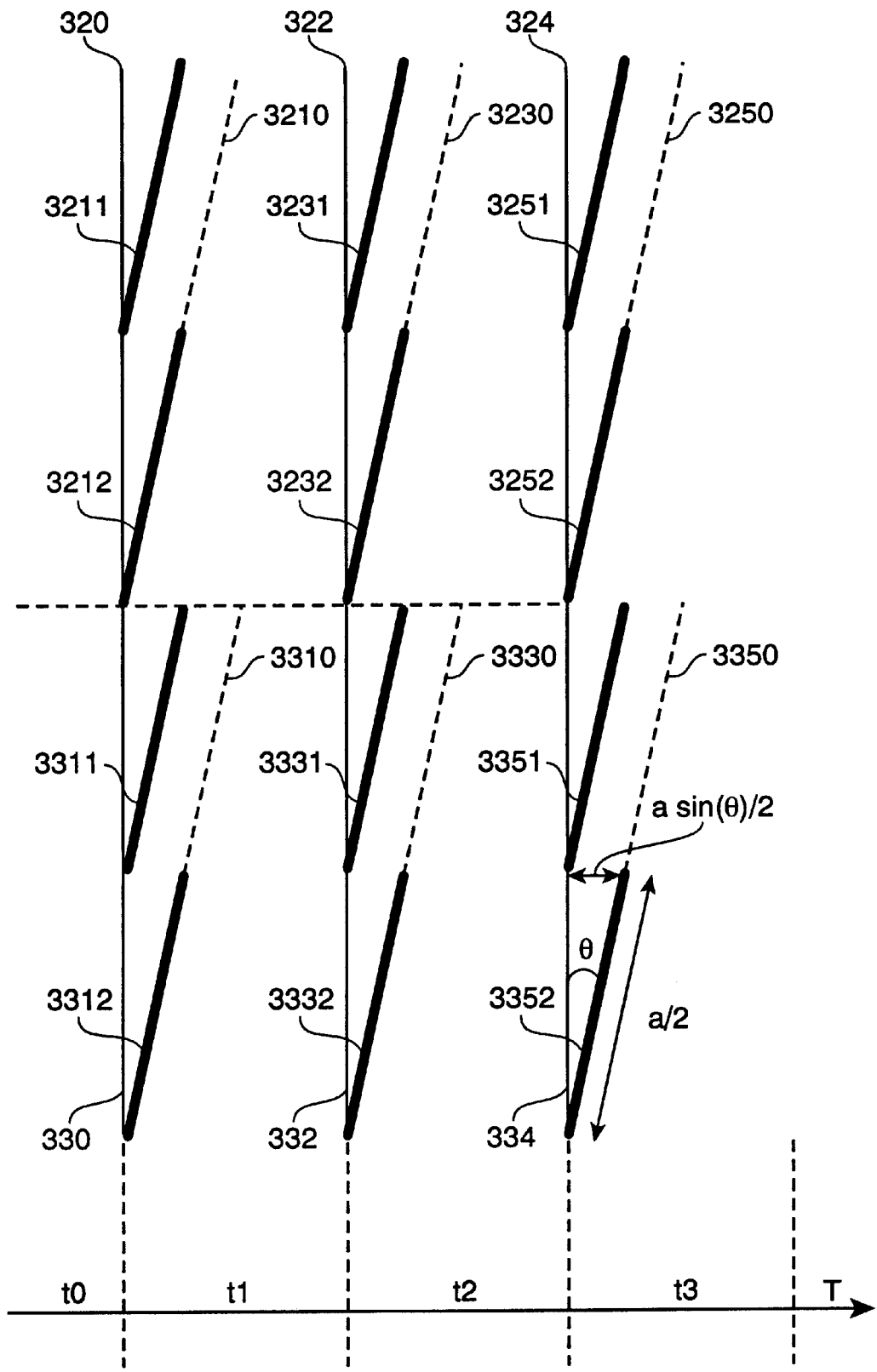
FIG. 33 illustrates the vertical lines of FIG. 32 after the tilt or misalignment is corrected.

In order to address this problem, the printing device shifts the original image (data representing the vertical lines, in this example) to be printed by nozzles located on the upper half of printhead 4A to the left by one pixel before providing it to printhead 4A. Therefore, as shown in FIG. 33, the upper half of printhead 4A prints vertical line 3211 at timing to during the first scan, and vertical line 3311 at timing t0 during the second scan. Vertical line 3211, which prints at timing t0, uses the image data representing vertical line 3210 (shown by a broken line in the figure) which should have been printed at timing t1.

On the other hand, the image data to be printed by nozzles located on the lower half of head 4A is provided without a shift. Accordingly, vertical line 3212 is printed at timing ti during the first scan and vertical line 3312 is printed at timing t1 during the second scan. Each other vertical lines is corrected in a similar manner.

This correction is equivalent to printing using a printhead having half of the actual head length and, therefore, the deviation of the vertical lines becomes a*sin(Θ)/2. Thus, by shifting the original image in accordance with the tilt of printhead 4A, the deviation of the vertical lines is halved down to within one pixel.

For the sake of simplicity, the above discussion relates to a case where printhead 4A is effectively divided into two halves. As can be easily understood, dividing the head into 4 or 8 sections will result in vertical lines having less deviation than the corrected lines of the above example.

Another feature of this preferred embodiment is a method to detect the misalignment of printhead 4A. This method is performed in a similar manner as that explained with respect to the first preferred embodiment, in which an amount of transverse misalignment between left and right printheads is measured. However, in this embodiment, the upper and lower halves of nozzles on a printhead are perceived to constitute independent, or left and right, printheads. Each "independent" printhead prints one part of a test pattern as explained with respect to the first preferred embodiment. Without modification, patterns printed by both halves do not overlap. Therefore, in order for the patterns printed by both halves to overlap, a printing medium is moved one-half its normal traveling distance, or a/2, and test patterns are printed in two scans.

As shown in FIG. 34, test patterns are printed based on "one dot—one space", "two dots—two spaces", and "four dots—four spaces" patterns, the patterns having a one, two and four pixel shift between the upper and lower halves, respectively, (FIG. 34B, FIG. 34D, and FIG. 34F), and having zero shift (FIG. 34A, FIG. 34C and FIG. 34E).

The density of the printed test patterns is measured by sensor 31. The Figures show the location of the area sensed by sensor 31. As described above, images with and without a shift present a different coverage rate (area factor) of ink per unit area. Hence, because only relative densities need be determined, a low-accuracy (low-resolution) sensor 31 can be used in this embodiment. Visual inspection by an operator could also reveal the differences in densities.

In a case where the vertical position of the upper and lower halves of printhead 4A is the same, or in a case where printhead 4A is not tilted, the images without a shift (normal data) have a higher density than those having a one, two or four pixel shift. On the contrary, in a case where the vertical position of the upper and lower halves of printhead 4A is not the same, or in a case where printhead 4A is tilted, the images having a shift of one, two or four pixels will have a higher density than those without a shift.

As described above, a transverse misalignment of between −3 and 4 pixels can be measured within an accuracy of one pixel by combining density measurement results at each step. In addition, the misalignment of printhead 4A can be measured by combining the measurement results with the "two dots—two spaces" patterns shown in FIG. 16.

While this preferred embodiment is explained for a case in which multiple printing elements of printhead 4A are driven simultaneously, it can be applied to a case in which the printing elements are driven sequentially. Furthermore, as explained with respect to the first preferred embodiment, this embodiment can be applied to a case in which, in order to eliminate printing misalignment during simultaneous driving, printheads 4A and 4B are tilted by a certain amount while printing elements are driven simultaneously across a certain distance. In either case, when printheads are mounted with a misalignment larger than a certain amount, the above-mentioned printing deviation (vertical line deviation) occurs.

In this preferred embodiment, the printing device measures printhead misalignment. However, printer driver 103 may measure the misalignment. Printer driver 103 can also correct the original image pixel by pixel (bit by bit).

(The seventh preferred embodiment)

This preferred embodiment corrects for differences in density of image portions printed by upper and lower halves of a printhead due to reasons such as spatial variations during printhead manufacturing. The printing device of this preferred embodiment is shown in FIG. 2. Although printhead 4A is discussed below, the method described below can also be applied to printhead 4B.

Figure 35:
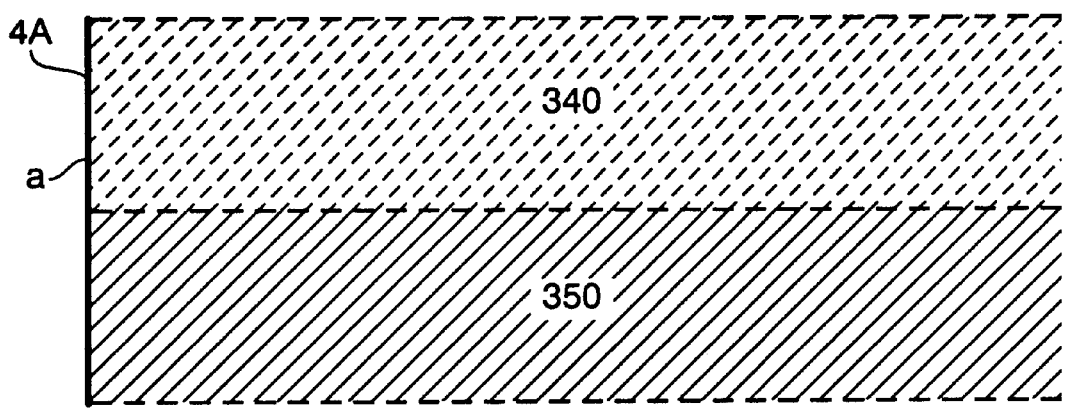
FIG. 35 shows printhead output having a difference in spatial density.

FIG. 35 illustrates an image which is printed with a constant density (e.g., 50%) by printhead 4A having multiple printing elements (nozzles) 40. The length of the row of nozzles 40 (hereafter called the head length) is "a". In the Figure, numeral 340 denotes an image printed by the upper half of printhead 4A, and numeral 350 denotes an image printed by the lower half. As shown in the Figure, the density of image 340 is lower than that of image 350. This difference adversely affects the image quality.

In this preferred embodiment, an original image is corrected by printer driver 103 using the multiple steps described below. The correction of image density can also be realized by controlling printing driving signals accordingly as well as by controlling output of the original image data.

Thus, the density variation within printhead 4A can be reduced by correcting an original image or driving signals based on the spatial density variation within the printhead.

One feature of this preferred embodiment is a method to detect the spatial density variation of printhead 4A. This method is performed in a similar manner as the method explained with respect to the third preferred embodiment, in which the density characteristics of left and right printheads 4A and 4B are measured. In other words, the upper and lower halves of nozzles on printhead 4A are perceived to constitute independent printheads, or left and right heads, and each "printhead" is given data for printing test patterns.

However, as described above with respect to the sixth preferred embodiment, patterns printed by both "printheads" do not overlap without modification of the method of the third preferred embodiment. In order for the patterns printed by both "printheads" to overlap, a printing medium is moved half of the normal traveling distance, or a/2, and the test patterns are printed in two paths.

In operation, the upper half of printhead 4A prints test pattern stripes in which the density gradually decreases from the left side of the image to the right. The lower half of printhead 4A prints test pattern stripes in which the density gradually increases from the left side of the image to the right. During the printing process of the test pattern, the stripes drawn by each "printhead" alternate with the stripes drawn by the other, as illustrated in FIG. 24A.

Subsequently, the density ratio between the upper and lower halves of printhead 4A is obtained from the position in the test pattern at which the density differences between adjacent stripes reverse sign, as described with respect to the third preferred embodiment.

For the sake of simplicity, the above discussion treats printhead 4A as comprising two "printheads". As can be easily understood, dividing printhead 4A into 4 or 8 sections will produce more effective density corrections.

In the above description, the present invention is explained using examples of shuttle-type printing devices in which two or three printheads are arranged in a scanning direction, and in which each printhead prints in an assigned portion of a divided print area. However, the present invention is applicable to other general types of printing devices.

For example, the features of the present invention addressing registration misalignments due to reciprocal movements and density relationships between images printed during reciprocal movements are applicable to any serial printer where bi-directional printing is performed. The features addressing transverse and lateral registration misalignments, and density relationships among images printed by multiple printheads are applicable to any printer having multiple printheads, such as a color printer and a gray scale (photo) printer.

As explained above, these preferred embodiments do not use absolute values of the sensor outputs. Rather, densities of multiple test patterns are compared relatively and the comparison results are used to determine transverse and lateral registration misalignments, as well as density ratios between multiple printheads. Based on the obtained information, compensation for transverse and lateral registration misalignments, and incorrect density ratios is automatically performed. Accordingly, the required measurement information can be obtained without using a high-accuracy sensor. Furthermore, dependence on particular measurement locations or measurement timing is eliminated.

In addition, the present invention is not restricted to an image printing device in which binary data is printed. This invention is also effective for a printing device which prints multiple-level image data. Lastly, the particular methods of signal processing disclosed above may all be performed by a printer driver.

This invention also provides benefits to a printing device which prints by affixing color ink on a print medium, based on image data. This invention provides larger benefits for an ink jet printing device which performs the printing function by ejecting liquid color ink.

Furthermore, this invention is applicable to any printing device which uses paper, cloth, leather, transparencies, metal and others as a print medium. Examples of such applicable printing devices include office document devices such as a printer, photocopier, and facsimile machine, as well as industrial production equipment.

While the present invention is described above with respect to what is currently considered to be its preferred embodiments, it is to be understood that the invention is not limited to the disclosed embodiments. To the contrary, the invention is intended to cover various modifications and equivalent arrangements included within the spirit and scope of the appended claims.

What is claimed is:

1. A method for controlling an image printing device comprising:

printing a first plurality of test patterns, the density of each of the first plurality of test patterns depending upon a measurement object;

determining a first relationship between image densities of the first plurality of printed test patterns;

printing a second plurality of test patterns in accordance with the first relationship;

determining a second relationship between image densities of the second plurality of printed test patterns; and acquiring information on the measurement object based on the second relationship.

2. A method for controlling an image printing device comprising the steps of:

printing a plurality of test patterns, the density of each of the plurality of test patterns being varied sequentially and the plurality of printed test patterns being specific to a measurement object;

determining a relationship between image densities of the plurality of printed test patterns; and acquiring information on the measurement object based on the determined relationship.

3. A printer driver to control a printing device, comprising:

codes to print a first plurality of test patterns, the density of each of the first plurality of test patterns depending upon a measurement object;

codes to determine a first relationship between image densities of the first plurality of printed test patterns;

codes to print a second plurality of test patterns in accordance with the first relationship;

codes to determine a second relationship between image densities of the second plurality of printed test patterns; and codes to acquire information on the measurement object based on the second relationship.

4. A printer driver according to claim 3, further comprising:

codes to correct image signals to be transmitted to the printing device based on the acquired information; and codes to transmit the corrected image signals to the printing device.

5. A printer driver to control a printing device, comprising:

codes to print a plurality of test patterns, the density of each of the plurality of test patterns being varied sequentially and the plurality of printed test patterns being specific to a measurement object;

codes to determine a relationship between image densities of the plurality of printed test patterns; and codes to acquire information on the measurement object based on the determined relationship.

6. A printer driver according to claim 5, further comprising:

codes to correct image signals to be transmitted to the printing device based on the acquired information; and codes to transmit the corrected image signals to the printing device.

7. A method for controlling a printing device using a scanning printhead to print upon a recording medium, comprising:

printing a first plurality of test patterns upon the recording medium, the density of each of the first plurality of test patterns depending upon a measurement object;

determining a first relationship between image densities of the first plurality of printed test patterns;

printing a second plurality of test patterns in accordance with the first relationship;

determining a second relationship between image densities of the second plurality of printed test patterns; and acquiring information on the measurement object based on the second relationship.

8. A method for controlling a printing device using a scanning printhead to print upon a recording medium, comprising the steps of:

printing a plurality of test patterns upon the recording medium, the density of each of the plurality of test patterns depending upon an amount of registration misalignment in reciprocal scanning directions to the printhead;

determining a relationship between image densities of the plurality of the printed test patterns; and acquiring information on the amount of registration misalignment based on the determined relationship.

9. A method for controlling a printing device using a scanning printhead to print upon a recording medium, comprising the steps of:

printing a plurality of test patterns upon the recording medium by multiple printheads, the density of each of the plurality of test patterns depending upon an amount of registration misalignment in reciprocal scanning directions to the multiple printheads;

determining a relationship between image densities of the plurality of the printed test patterns; and acquiring information on the amount of registration misalignment based on the determined relationship.

10. A method according to claim 9, wherein the densities of the plurality of test patterns vary in a direction perpendicular to a registration direction of the multiple printheads, and wherein, in said acquisition step, an amount of registration misalignment in the direction perpendicular to the registration direction of the multiple printheads is acquired.

11. A method according to claim 9, wherein the densities of the plurality of test patterns vary in a direction parallel to a registration direction of the multiple printheads, and wherein, in said acquisition step, an amount of registration misalignment in the direction parallel to the registration direction of the multiple printheads is acquired.

12. A method according to claim 9, wherein each of the multiple printheads prints a plurality of test patterns, the density of each of the plurality of test patterns varying in a direction perpendicular to the reciprocal movements of the multiple printheads, and wherein, in said acquisition step, the amounts of registration misalignment in the registration direction of the reciprocal movements of each of the multiple printheads is acquired.

13. A method according to claim 9, wherein the multiple printheads are disposed at a fixed distance from each other in a scanning direction.

14. A method according to claim 13, wherein the multiple printheads each print using a same color ink, and wherein the multiple printheads print within areas of the recording medium divided along the scanning direction.

15. A method according to claim 9, wherein a plurality of the multiple printheads print using ink of different densities, and wherein the multiple printheads cooperatively print a gray-scale image within an area of the recording medium in which divided print areas corresponding to a plurality of the multiple printheads overlap.

16. A method for controlling a printing device using a scanning printhead to print upon a recording medium, comprising the steps of:

printing a plurality of test patterns upon the recording medium by multiple printheads, the plurality of test patterns depending upon an amount of registration misalignment in reciprocal scanning directions of the multiple printheads and the density of each of the plurality of test patterns being varied sequentially based on an area of a measurement object;

determining a relationship between image densities of a plurality of the printed test patterns being specific to the area of the measurement object; and acquiring information on the amount of registration misalignment based on the determined relationship.

17. A method according to claim 16, wherein the densities of the plurality of test patterns continuously change in each of two opposite scanning directions.

18. A method according to claim 16, wherein relative densities of test patterns printed by one of the multiple printheads with respect to test patterns printed by one other of the multiple printheads continuously change.

19. A method according to claim 16, wherein the multiple printheads are disposed at a fixed distance from each other in a scanning direction.

20. A method according to claim 16, wherein the multiple printheads each print using a same color ink, and wherein the multiple printheads print within assigned areas of the recording medium divided along a scanning direction.

21. A method according to claim 16, wherein a plurality of the multiple printheads print using ink of different densities, and wherein the multiple printheads cooperatively print a gray-scale image within an area of the recording medium in which divided print areas corresponding to a plurality of the multiple printheads overlap.

22. An image printing apparatus comprising:

printing means for printing a first plurality of test patterns, the image density of each of the first plurality of test patterns depending upon a measurement object;

determining means for determining a relationship between image densities of a plurality of the printed test patterns;

print controlling means for printing a second plurality of test patterns in accordance with the relationship between image densities of the first plurality of printed test patterns; and means for acquiring information on the measurement object based on the relationship determined by said determining means.

23. An image printing apparatus according to claim 22, further comprising adjusting means for adjusting the measurement object based on the information acquired by said acquiring means.

24. An image printing apparatus according to claim 22, wherein said determining means includes a sensor to measure the density of printed patterns.

25. An image printing apparatus having multiple printheads, comprising:

printing means for printing, using the multiple printheads cooperatively, a basic pattern and a plurality of patterns, each of which are constructed by shifting aspects of the basic pattern by a predetermined distance in a direction of reciprocal scanning;

determining means for determining a relationship between densities of a plurality of the patterns printed by said printing means; and acquiring means for acquiring information on positional misalignment of the multiple printheads in the direction of reciprocal scanning based on the determined relationship.

26. An image printing apparatus comprising:

printing means for printing a plurality of patterns having a continuously changing density relationship;

determining means for determining a relationship between the densities of the plurality of the patterns printed by said printing means; and acquiring means for acquiring information on output density relationships of printing elements based on the determined relationship.

27. An image printing apparatus according to claim 26, wherein said printing means prints a test pattern having a density continuously changing from low to high and a test pattern having a density continuously changing from high to low.

28. An image printing apparatus according to claim 26, wherein said determining means determines a relationship between the densities of adjacent stripes within the printed patterns.

29. A method for controlling a printing device using a scanning printhead to print upon a recording medium, comprising the steps of:

printing a plurality of test patterns, the test patterns having density changing in a scanning direction of the printhead, upon the recording medium by using each of a plurality of areas divided in the printhead;

determining a relationship between densities of a plurality of the printed test patterns; and acquiring information on positional misalignment in the scanning direction of the printhead based on the determined relationship.

30. A method according to claim 29, wherein a test pattern printed by one area of the printhead has density which continuously changes in the scanning direction, and wherein, in said acquiring step, information on the print density of the plurality of areas of the printhead is acquired based on the determined relationship.

31. An image print method for printing an image by recording dots along a scanning of a printhead, comprising the steps of:

printing a plurality of test patterns having a plurality of dots and a plurality of spaces in at least a predetermined direction, the plurality of test patterns having a density depending on an amount of registration misalignment of the printhead;

determining a relationship between densities of the plurality of printed test patterns; and acquiring an amount of registration misalignment on the plurality of dots of the printhead based on the determined relationship.

32. An image printing method according to claim 31, wherein the plurality of test patterns has a density depending on registration misalignment in reciprocal scanning directions of the printhead, and wherein, in said acquiring step, an amount of registration misalignment in the reciprocal scanning directions on the plurality of dots of the printhead is acquired based on the determined relationship.

33. An image printing method according to claim 31, wherein, in said printing step, the plurality of test patterns are printed by multiple printheads and have a density depending on an amount of registration misalignment in the predetermined direction between the multiple printheads, and wherein, in said acquiring step, an amount of registration misalignment on the plurality of dots in the predetermined direction of the multiple printheads is acquired based on the determined relationship.

* * * * *

UNITED STATES PATENT AND TRADEMARK OFFICE
CERTIFICATE OF CORRECTION

PATENT NO. : 6,089,766

DATED : July 18, 2000

INVENTORS : AKITOSHI YAMADA, et al.

It is certified that error appears in the above-identified patent and that said Letters Patent is hereby corrected as shown below:

COLUMN 12

Line 51, "are" should read --is--.

COLUMN 13

Line 12, "perform" should read --performs--.

COLUMN 16

Line 41, "affects" should read --affect--.

COLUMN 17

Line 41, "a" should read --an--.

COLUMN 18

Line 49, "ration" should read --ratio--.

UNITED STATES PATENT AND TRADEMARK OFFICE
CERTIFICATE OF CORRECTION

PATENT NO. : 6,089,766
DATED : July 18, 2000
INVENTORS : AKITOSHI YAMADA, et al.                    Page 2 of 2

It is certified that error appears in the above-identified patent and that said Letters Patent is hereby corrected as shown below:

<u>COLUMN 21</u>

Line 31, "share" should read --shares--.

<u>COLUMN 23</u>

Line 42, "to" should read --t0--.
Line 50, "ti" should read --t1--.
Line 52, "Each" should read --Each of the--.

Signed and Sealed this

Fifteenth Day of May, 2001

Attest:

NICHOLAS P. GODICI

Attesting Officer    Acting Director of the United States Patent and Trademark Office